US011976540B2

(12) United States Patent
Xia et al.

(10) Patent No.: US 11,976,540 B2
(45) Date of Patent: May 7, 2024

(54) FRACTURING A SUBSURFACE FORMATION BASED ON A PROBABILISTIC DETERMINATION OF THE REQUIRED BREAKDOWN PRESSURE

(71) Applicant: Saudi Arabian Oil Company, Dhahran (SA)

(72) Inventors: Kaiming Xia, Dhahran (SA); Yufeng Cui, Beijing (CN)

(73) Assignee: Saudi Arabian Oil Company, Dhahran (SA)

( * ) Notice: Subject to any disclaimer, the term of this patent is extended or adjusted under 35 U.S.C. 154(b) by 730 days.

(21) Appl. No.: 17/168,734

(22) Filed: Feb. 5, 2021

(65) Prior Publication Data
US 2022/0259960 A1 Aug. 18, 2022

(51) Int. Cl.
*E21B 43/26* (2006.01)
*G01V 99/00* (2009.01)

(52) U.S. Cl.
CPC .......... *E21B 43/26* (2013.01); *E21B 43/2607* (2020.05); *G01V 99/005* (2013.01); *E21B 2200/20* (2020.05)

(58) Field of Classification Search
CPC .. E21B 43/26; E21B 43/2607; E21B 2200/20; G01V 99/005
See application file for complete search history.

(56) References Cited

U.S. PATENT DOCUMENTS

| | | | |
|---|---|---|---|
| 6,724,687 | B1 | 4/2004 | Stephenson et al. |
| 7,073,578 | B2 | 7/2006 | Vinegar et al. |
| 7,121,342 | B2 | 10/2006 | Vinegar et al. |
| 7,360,588 | B2 | 4/2008 | Vinegar et al. |
| 7,890,307 | B2 | 2/2011 | Geehan et al. |
| 7,942,203 | B2 | 5/2011 | Vinegar et al. |
| 8,579,031 | B2 | 11/2013 | Vinegar |
| 2016/0045841 | A1 | 2/2016 | Kaplan et al. |
| 2016/0281497 | A1* | 9/2016 | Tilke .............. E21B 47/00 |
| 2017/0051598 | A1 | 2/2017 | Ouenes |
| 2017/0169137 | A1 | 6/2017 | Shen et al. |
| 2018/0016897 | A1* | 1/2018 | Willberg ........... E21B 49/005 |
| 2018/0293789 | A1 | 10/2018 | Shen et al. |
| 2019/0292884 | A1* | 9/2019 | McClure .......... G06F 3/04815 |
| 2019/0345803 | A1 | 11/2019 | Madasu et al. |

FOREIGN PATENT DOCUMENTS

| | | |
|---|---|---|
| AU | 2013206713 | 7/2013 |
| CA | 2884071 | 3/2014 |
| CN | 104459775 | 2/2017 |
| CN | 109711595 | 5/2019 |
| KR | 101620506 | 5/2016 |
| WO | 2016100762 | 6/2016 |
| WO | 2020139344 | 7/2020 |

OTHER PUBLICATIONS

SAIP Examination report in Saudi Arabian Appln. No. 122430630, dated Sep. 30, 2023, 12 pages (with English translation).
PCT International Preliminary Report on Patentability in International Appln. No. PCT/US2021/055543, dated May 4, 2023, 10 pages.
Michael et al., "Orientation prediction of fracture initiation from perforated horizontal wells: Application in shale reservoirs," Journal of Petroleum Science and Engineering, May 2020, 14 pages.
PCT International Search Report and Written Opinion in International Appln. No. PCT/US2021/055543, dated Feb. 10, 2022, 16 pages.
Zeng et al., "Perforation Orientation Optimization to Reduce the Fracture Initiation Pressure of a Deviated Cased Hole" Journal of Poetroleum Science and Engineering, vol. 177, Jun. 2019, 829-840, 12 pages.
U.S. Appl. No. 17/075,342, filed Oct. 20, 2020, Xia et al.
U.S. Appl. No. 17/140,252, filed Jan. 4, 2021, Xia et al.
Abaqus, "Concreate Damaged Plasticity" ABAQUS Online Manual, 2019, 14 pages.
Alekseenko et al., "3-D modeling of fracture initiation from perforated non-cemented wellbore" SPE 151585. The Proceeding of the SPE Hydraulic Fracturing Technology Conference held in the Woodlands, Texas, USA, Feb. 2012, 12 pages.
El-Rabaa et al., "New perforation pressure loss correlations for limited entry fracturing treatments" SPR-38373, The Proceedings of the SPE Rocky Mountain Regional Meeting. Casper, Wyoming, May 18-21, 1997, 9 pages.
Haimson et al., "Initiation and extension of hydraulic fractures in rock" Society of Petroleum Engineers. V.7, 1967, 310-318, 9 pages.
Hossain et al., "Hydraulic fracture initiation and propagation: roles of wellbore trajectory" Perforation and stress reginme. J. Pet. Sci. & Eng. vol. 27, 2000, 129-149, 21 pages.
Hubbert et al., "Mechanics of hydraulic fracturing" Petroleum Transaction, AIME. V.210, 1957, 153-168, 16 pages.

(Continued)

*Primary Examiner* — Kumar R Bhushan
(74) *Attorney, Agent, or Firm* — Fish & Richardson P.C.

(57) ABSTRACT

Techniques for hydraulic fracturing a subsurface formation can include using a deterministic model to simulate a deviated well comprising a casing and at least one perforation tunnel. The techniques can include determining a different statistical distribution for each of one or more parameters to the deterministic model. The statistical distributions can be determined from the log data along the measured depth within the wellbore. The techniques can include probabilistically solving the deterministic model to determine a mean and a standard deviation of breakdown pressures along the measured depth within the wellbore. The techniques can include processing the mean and the standard deviation of breakdown pressures to determine an upper bound breakdown pressure based on a level of confidence. The techniques can include drilling and completing a deviated well based on the determined upper bound breakdown pressure and injecting hydraulic fluid to cause hydraulic fracturing of the subsurface formation.

19 Claims, 22 Drawing Sheets

(56) References Cited

OTHER PUBLICATIONS

Kurdi et al., "A New Computational Model to Predict Breakdown Pressures in Cased and Perforated Wells in Unconventional Reservoirs" ASEG Extended Abstracts, 2018, 10 pages.

Lubliner, "A Plastic-Damage Model for Concrete" International Journal of Solids and Structures, vol. 25, No. 3, 1989, 28 pages.

Michael, "Orientation of hydraulic fracture initiation from perforated horizontal wellbore" SPE-199766-STU. The SPE Annual Technical Conference and Exhibition held in Calgary, Canada, Oct. 2019, 23 pages.

Shi et al., "An analytical solution to stress state of casing-cement sheath-formation system with the consideration of its initial loaded state and wellbore temperature variation." International Journal of Emerging Technology and Advanced Engineering 5.1, 2015, 59-65, 8 pages.

Waters et al., "The impact of geomechanics and perforations on hydraulic fracture initiation and complexity in horizontal well completions" SPE-181684-MS. The Proceedings of the SPE Annual Technical Conference and Exhibition held in Dubai, UAE, Sep. 26-28, 2016, 36 pages.

Weng et al., "Analytical model for predicting fracture initiation pressure from a cased and perforated wellbore" SPE-191462-18IHFT-MS, The Proceedingof the SPE International Hydraulic Fracturing Technology Conference and Exhibition. Muscat, Oman, Oct. 16-18, 2018, 21 pages.

Fatahi et al., "Numerical simulation for the determination of hydraulic fracture initiation and breakdown pressure using distinct element method." Journal of Natural Gas Science and Engineering 33, Jul. 2016, 1219-1232, 22 pages.

Gao et al., "New damage evolution model of rock material." Applied Mathematical Modelling 86, Oct. 2020, 207-224, 18 pages.

Jin et al., "Breakdown pressure determination—a fracture mechanics approach." SPE Annual Technical Conference and Exhibition. OnePetro, Sep. 2013, 18 pages.

Li et al., "A statistical meso-damage mechanical method for modeling trans-scale progressive failure process of rock." International Journal of Rock Mechanics and Mining Sciences 74, Feb. 2015, 133-150, 18 pages.

Liu et al., "The impact of oriented perforations on fracture propagation and complexity in hydraulic fracturing." Processes 6.11, 213, Nov. 2018, 19 pages.

Nguyen et al., "A cohesive damage-plasticity model for DEM and its application for numerical investigation of soft rock fracture properties." International Journal of Plasticity 98, Nov. 2017, 175-196, 22 pages.

Sampath et al., "Theoretical overview of hydraulic fracturing breakdown pressure." Journal of Natural Gas Science and Engineering 58, Oct. 2018, 251-265, 57 pages.

Shan et al., "A new finite element method to predict the fracture initiation pressure." Journal of Natural Gas Science and Engineering 43, Jul. 2017, 58-68, 19 pages.

Shen, "Modeling fractures with continuum damage and its numerical application to stimulation estimates." 46th US Rock Mechanics/Geomechanics Symposium. OnePetro, Jun. 2012, 7 pages.

Tang et al., "Damage analysis and numerical simulation for failure process of a reinforced concrete arch structure." Computers & structures 83.31-32, Dec. 2005, 2609-2631, 23 pages.

Wen et al., "Energy analysis of the deformation and failure process of sandstone and damage constitutive model." KSCE Journal of Civil Engineering 23.2, Feb. 2019, 513-524, 12 pages.

PCT International Search Report and Written Opinion in International Appln. No. PCT/US2021/065128, dated May 6, 2022, 15 pages.

* cited by examiner

FRACTURING A SUBSURFACE FORMATION BASED ON A PROBABILISTIC DETERMINATION OF THE REQUIRED BREAKDOWN PRESSURE

TECHNICAL FIELD

The present disclosure describes systems and methods for determining a subsurface formation breakdown pressure and, more particularly, probabilistically determining a subsurface formation breakdown pressure for a deviated, cased hole and clustered perforation hydraulic fracturing treatment.

BACKGROUND

Hydraulic fracturing has been used to stimulate tight formation and shale oil/gas reservoirs. Rock breakdown or fracture initiation is typically required for a successful hydraulic fracturing treatment. For hydraulic fracturing treatments, accurately estimating a breakdown pressure of a subsurface formation may help determine correct selections of casing size, tubing size, and wellhead (for example, to correctly select their respective burst pressure limiting requirements), as well as a pump schedule design. Otherwise, the hydraulic fracturing operation may not properly inject a fracturing liquid to fracture the formation (for example, if the breakdown pressure was underestimated). Conventionally, hydraulic fracturing simulators may not accurately predict the breakdown pressure due to, for example, model simplifications.

SUMMARY

The systems and methods described in this disclosure are related to fracturing of a subsurface formation based on a breakdown pressure prediction from a probabilistic model. The probabilistic model accounts for uncertainties in the properties of the structure of the well (for example, inner and outside diameters of the tubing, Young's modulus of the tubing, etc.), uncertainties in the properties of the subsurface formation (for example, in-situ stresses and orientations of the rock, tensile failure of the rock), and uncertainties of modeling parameters (for example, perforation friction). In some examples, the properties include mechanical properties, geometric properties, in-situ stresses, and orientation of the in-situ stresses. The probabilistic model accounts for these uncertainties via a statistical analysis to generate an upper and lower bound of breakdown pressure of the well.

In some examples, the probabilistic model is integrated into a deterministic computational model for calculating the breakdown pressure. For example, a computational model for calculating the breakdown pressure is described in U.S. application Ser. No. 17/075,342, filed Oct. 20, 2020, the disclosure of which is hereby incorporated by reference in its entirety. In this example, the deterministic result of the computational model described in U.S. application Ser. No. 17/075,342 is extended to a probabilistic result that accounts for uncertainties of the properties of the model.

In other examples, the computational model is a finite element analysis model and the integrated model is referred to as a stochastic finite element model. For example, a computational model for calculating the breakdown pressure is described in U.S. application Ser. No. 17/140,252, filed Jan. 4, 2021, the disclosure of which is hereby incorporated by reference in its entirety. In this example, the deterministic result of the computational model described in U.S. application Ser. No. 17/140,252 is extended to a probabilistic result that accounts for uncertainties of the properties of the model using a stochastic finite element approach.

In some examples, the probabilistic model includes a Monte Carlo simulation method. In a Monte Carlo simulation, input parameters with uncertainties are sampled using a random number from input statistical distributions. Each set of samples is an iteration or realization and the resulting outcome from that sample is recorded in computer memory. Monte Carlo simulations repeat each set of samples thousands of times or more and produce distributions of possible outcome values based on the uncertainties represented by the input statistical distributions. Monte Carlo simulations provide a comprehensive view of what might happen during a fracking treatment when uncertainties of the input parameters are considered in a deterministic model.

In some implementations, the probabilistic analysis of breakdown pressure is an extension of the deterministic breakdown pressure model described in U.S. application Ser. No. 17/075,342. The probabilistic model considers the uncertainties of the casing-cement-formation system that can arise in cement and rock mechanical properties, casing geometries, perforation conditions, etc. Different scenarios of the uncertainties for each input parameter are randomly generated using the Monte Carlo simulations. The probabilistic model produces statistical distributions of breakdown pressures expected within a wellbore and determines a pump schedule used in a fracking process based on an upper limit of the breakdown pressures within a confidence interval. When the pump schedule is determined based on the statistical distributions of breakdown pressures, the pump and components of the well are sized to provide the necessary breakdown pressure for fracturing subsurface formation.

During hydraulic fracturing treatment, hydraulic fluid is pumped into deviated and cased-hole wells to cause fracturing of the subsurface formation. These wells have fracturing stages of perforations with perforation clusters. Each of the perforation clusters include multiple perforation tunnels that each extend into the subsurface formation. In most examples, pumping hydraulic fluid into the well generates substantially equal pressure within each perforation tunnel and preferably the generated pressure in each perforation tunnel is sufficient to fracture the subsurface formation at each respective perforation tunnel.

However, in some examples, fracturing occurs at some perforation tunnels but does not occur at other perforation tunnels. As described above, the hydraulic pump may be inadequately sized to provide the needed hydraulic pressure to fracture all perforation tunnels of the well. As a result, the hydraulic pump needs to be replaced with a more powerful pump. In some examples, this requires the engineers to reevaluate the structural performance of the well (for example, the tubing, the cement, the casing, etc.) to predict whether the well can survive the higher pressures. This process incurs significant costs and delays to the well installation schedule.

Systems and methods of hydraulic fracturing a subsurface formation can include using a deterministic model implemented on at least one processor to simulate a deviated well comprising a casing and at least one perforation cluster; determining a different statistical distribution for each of one or more parameters to the deterministic model based on log data from a wellbore, the statistical distributions being represented as a function of a measured depth within the wellbore; probabilistically solving the deterministic model implemented on the at least one processor to determine a mean and a standard deviation of breakdown pressures for each perforation cluster of the at least one perforation cluster by randomly accounting for uncertainties of the one or more parameters based on the determined statistical distributions for each of the one or more parameters; processing the mean and the standard deviation of breakdown pressures for each perforation cluster to determine an upper bound breakdown pressure for each perforation cluster based on a confidence level; drilling and completing a deviated well with a wellhead selected at least in part based on the determined upper bound breakdown pressure for each perforation cluster; and injecting hydraulic fluid into the deviated well at an injection pressure determined at least in part on the determined upper bound breakdown pressure for each perforation cluster to cause hydraulic fracturing of the subsurface formation.

Implementations of these systems and methods can include one or more of the following features.

In some implementations, the method includes determining a different mean and standard deviation of breakdown pressures for each fracturing stage of the deviated well.

In some implementations, the one or more parameters include an orientation angle of the maximum horizontal stress of the subsurface formation. In some cases, the statistical distribution of the orientation angle is a normal distribution with a mean and a standard deviation.

In some implementations, the one or more parameters include a tensile strength of the subsurface formation. In some cases, the statistical distribution of the tensile strength is a normal distribution with a mean and a standard deviation.

In some implementations, the one or more parameters include both an orientation angle of the maximum horizontal stress of the subsurface formation and a tensile strength of the subsurface formation and the statistical distributions for both the orientation angle and the maximum horizontal stress are normal distributions.

In some implementations, the one or more parameters include both a Young's modulus and a Poisson's ratio of the subsurface formation and both the statistical distribution of the Young's modulus and the Poisson's ratio are normal distributions.

In some implementations, the one or more parameters include an azimuth angle and a deviation angle of the wellbore.

In some implementations, the one or more parameters include a perforation fraction representing a fraction of wellbore pressure transferred to a perforation hole and acting on a perforation wall of the at least one perforation tunnel to counter induced hoop stresses by in-situ stresses.

In some implementations, probabilistically solving the deterministic model includes: randomly generating a pair of stochastic parameters based on the statistical distributions of each respective parameter of the one or more parameters using a Box-Muller method; and substituting the pair of randomly generated stochastic parameters into the deterministic model to determine at least part of the mean and standard deviation of breakdown pressures.

In some implementations, probabilistically solving the deterministic model includes: transforming, with the at least one processor, in-situ stresses from a global coordinate system to a wellbore coordinate system of a deviated portion of the deviated well that comprises at least one perforation tunnel for each perforation cluster; and transforming, with the at least one processor, the in-situ stresses from the wellbore coordinate system to a perforation coordinate system through at least one rotation matrix, wherein the breakdown pressures are determined based at least in part on the in-situ stresses in the perforation coordinate system.

In some implementations, probabilistically solving the deterministic model comprises performing a Monte Carlo statistical analysis. In some cases, performing the Monte Carlo statistical analysis involves at least one thousand different variations of the one or more parameters to the deterministic model.

In some implementations, processing the mean and the standard deviation of breakdown pressures comprises generating a histogram of the breakdown pressures for each perforation cluster.

In some implementations, the breakdown pressures are determined based at least in part on hoop stresses at a perforation tunnel wall of at least one perforation tunnel for each perforation cluster.

In some implementations, the confidence level is a 95% confidence level.

In some implementations, the systems and methods include determining a pump schedule of an injection pump based at least in part on the determined upper bound breakdown pressure for each perforation cluster. In some cases, injecting the hydraulic fluid into the deviated well is performed by the injection pump using the determined pump schedule.

The systems and methods described in this specification provide various advantages.

In some implementations, the method generates statistical distribution of input parameters for deviated and cased-hole wells. For example, log data and an Earth model is used to determine the statistical distribution of one or more input parameters to the model as a function of depth in the wellbore. In some examples, the method determines a mean and a standard deviation associated with a normal distribution of the statistical distributions based on the log data. In some implementations, the method improves the success rate of causing breakdown of subsurface formations for hydraulic fracturing treatments. The success rate is improved by accounting for uncertainties of the input parameters to a deterministic model for determining breakdown pressure. For example, in some cases, the pump size and pump schedule is determined based on the results from the probabilistic model to improve the success rate of fracturing.

In some implementations, the inherent variability of rock mechanical properties are included to determine a statistical distribution breakdown pressure for fracturing treatment by accounting for the uncertainties in rock using a probabilistic model. In some examples, it is important to account for uncertainties in rock because the natural variability and uncertainty in rock properties spatially vary based on various factors that were present during the formation of the rock.

In some implementations, the method combines a probabilistic model with a deterministic breakdown pressure model. The combination of the probabilistic and deterministic models allows the uncertainties to be excluded to produce deterministic results. In some examples, the combined probabilistic and deterministic model simplifies storage and maintenance of the model compared to separately storing and maintaining different models.

In some implementations, the method generates statistical distribution of breakdown pressures for deviated and cased-hole wells while considering different perforation angles and a casing-cement effect. The inclusion of these features allows the model to accurately capture the physics of a physical deviated well.

In some implementations, the method is computationally fast. For example, by integrating a probabilistic model with an analytic deterministic breakdown pressure model, the model is solvable orders of magnitudes faster than solving a finite element method integrated with a probabilistic model.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
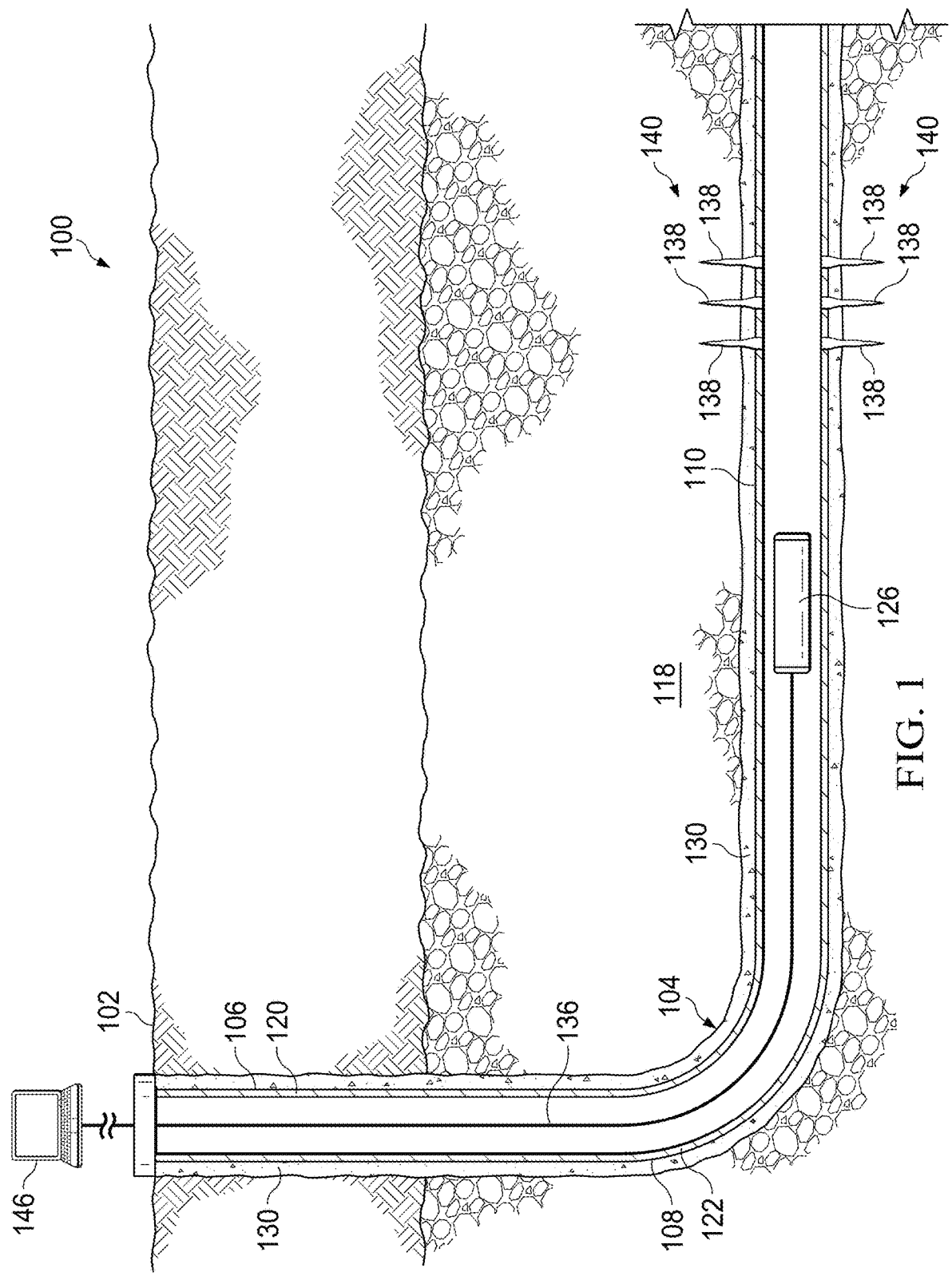
FIG. 1 is a schematic diagram of an example implementation of a wellbore system according to the present disclosure.

The systems and methods described in this disclosure are related to fracturing of a subsurface formation based on a breakdown pressure prediction from a probabilistic model. The probabilistic model accounts for uncertainties in the properties of the structure of the well (for example, inner and outside diameters of the tubing, Young's modulus of the tubing, etc.), uncertainties in the properties of the subsurface formation (for example, in-situ stresses and orientations of the rock, tensile failure of the rock), and uncertainties of modeling parameters (for example, perforation friction). In some examples, the properties include mechanical properties, geometric properties, in-situ stresses, and orientation of the in-situ stresses. The probabilistic model accounts for these uncertainties via a statistical analysis to generate an upper and lower bound of breakdown pressure of the well.

The determination of the breakdown pressure of a well depends on mechanical properties, geometric properties, in-situ stresses, and orientations of the in-situ stresses. Each of these properties include uncertainties due to spatial variability (for example, the in-situ stresses vary spatially throughout the rock, the consistency of the cement varies spatially along the length of the well, the bonding strength between the casing and cement varies spatially along the length of the well, the lengths of each perforation tunnel spatially varies, etc.), logging measurements (for example, inaccurate or non-calibrated measurement equipment), and data processing (for example, analog-to-digital conversion, numerical round off, numerical filtering, etc.).

The systems and methods described in this disclosure extend a deterministic prediction of breakdown pressure (for example, via a deterministic model) to a probabilistic prediction of breakdown pressure via a probabilistic model using a Monte Carlo method. The Monte Carlo method includes stochastic parameters (for example, via a Box-Muller method) representing the uncertainties of input parameters of the deterministic model (for example, the mechanical properties, geometric properties, in-situ stresses, and orientations of the in-situ stresses).

In some examples, statistical information about the uncertainties is measured using logging measurements within the well and through data processing (for example, curve fitting, comparison with a historical information, etc.). In some cases, a property measurement (for example, rock in-situ stress) is obtained multiple times using a logging measurement tool within the well and processed (for example, via a computer) to determine a mean and standard deviation of the property measurement.

The combination of a deterministic breakdown pressure model and a probabilistic Monte Carlo model is to predict a statistical distribution of the breakdown pressure. The statistical distribution indicates how likely a particular breakdown pressure might occur in a physical well. In other words, the Monte Carlo simulation accounts for different randomly generated uncertainty scenarios that could arise when performing a hydraulic fracturing treatment in a well.

The method determines a confidence interval of the breakdown pressure with a specified level of confidence (for example, a 95% confidence). For example, a 95% confidence level represents a 95% probability that the confidence interval contains the true breakdown pressure required for fracturing the subsurface formation. The upper limit of the confidence interval is selected as a conservative prediction of the required breakdown pressure for a physical deviated well.

FIG. 1 is a schematic diagram of an example implementation of a wellbore system 100 according to the present disclosure. In some aspects, the wellbore system 100 (all or part of it) may provide a wellbore system and computational framework (for example, embodied in control system 146) for calculating a breakdown pressure of a subsurface formation. In some aspects, the wellbore system 100 (and the computational framework) provides such a determination for a deviated, cased hole, and clustered perforation hydraulic fracturing treatment, while taking into account an impact of casing-cement mechanical properties on the breakdown pressure.

In some aspects, the computational framework (for example, executed on a control system 146) of wellbore system 100 provides for a layout of a series of coordinate system transformations and corresponding rotation matrices, for example, to streamline a stress tensor projection onto different coordinate systems. The computational framework of wellbore system 100 may also account for one or more effects of casing-cement intermediate layers in a deviated wellbore to calculate the breakdown pressure of a subsurface formation. The computational framework of wellbore system 100 may also account for a potential effect of perforation quality on estimating the breakdown pressure of a subsurface formation. The computational framework of wellbore system 100 improves current available models on calculating breakdown pressure, for example, which are applicable to deviated, cased wellbores, and clustered perforation hydraulic fracturing treatments.

As illustrated, the wellbore system 100 includes a wellbore 104 formed (for example, drilled or otherwise) from a surface 102 and to and into subsurface formation 118. Although the surface 102 is illustrated as a land surface 102 may be a sub-sea or other underwater surface, such as a lake or an ocean floor or other surface under a body of water. Thus, the present disclosure contemplates that the wellbore 104 may be formed under a body of water from a drilling location on or proximate the body of water.

The illustrated wellbore 104 is a directional wellbore in this example of wellbore system 100. For instance, the wellbore 104 includes a substantially vertical portion 106 coupled to a radiused or curved portion 108, which in turn is coupled to a substantially horizontal portion 110. As used in the present disclosure, "substantially" in the context of a wellbore orientation, refers to wellbores that may not be exactly vertical (for example, exactly perpendicular to the surface 102) or exactly horizontal (for example, exactly parallel to the surface 102). In other words, those of ordinary skill in the drill arts would recognize that vertical wellbores often undulate offset from a true vertical direction that they might be drilled at an angle that deviates from true vertical, and horizontal wellbores often undulate offset from a true horizontal direction. Further, the substantially horizontal portion 110, in some aspects, may be a slant wellbore or other directional wellbore that is oriented between exactly vertical and exactly horizontal. The substantially horizontal portion 110, in some aspects, may be oriented to follow a slant of the formation. As illustrated in this example, the three portions of the wellbore 104—the vertical portion 106, the radiused portion 108, and the horizontal portion 110—form a continuous wellbore 104 that extends into the Earth. Thus, in this example implementation, at least a portion of the wellbore 104, such as the radiused portion 108 and the horizontal portion 110, may be considered a deviated wellbore, in other words, a non-vertical wellbore.

The illustrated wellbore 104 has a surface casing 120 positioned and set around the wellbore 104 from the surface 102 into a particular depth in the Earth. For example, the surface casing 120 may be a relatively large-diameter tubular member (or string of members) set (for example, cemented) around the wellbore 104 in a shallow formation. As used herein, "tubular" may refer to a member that has a circular cross-section, elliptical cross-section, or other shaped cross-section. As illustrated, a production casing 122 is positioned and set within the wellbore 104 downhole of the surface casing 120. Although termed a "production" casing, in this example, the casing 122 may or may not have been subject to hydrocarbon production operations. Thus, the casing 122 refers to and includes any form of tubular member that is set (for example, cemented) in the wellbore 104 downhole of the surface casing 120. In some examples of the wellbore system 100, the production casing 122 may begin at an end of the radiused portion 108 and extend throughout the substantially horizontal portion 110. The casing 122 could also extend into the radiused portion 108 and into the vertical portion 106.

As shown, cement 130 is positioned (for example, pumped) around the casings 120 and 122 in an annulus between the casings 120 and 122 and the wellbore 104. The cement 130, for example, may secure the casings 120 and 122 (and any other casings or liners of the wellbore 104) through the subsurface layers under the surface 102. In some aspects, the cement 130 may be installed along the entire length of the casings (for example, casings 120 and 122 and any other casings), or the cement 130 could be used along certain portions of the casings if adequate for the particular wellbore 104. Other casings, such as conductor casings or intermediate casings, are also contemplated by the present disclosure for the well-bore system 100.

As illustrated, the wellbore 104 extends through one or more subsurface layers (not specifically labeled) and lands in subsurface formation 118. The subsurface formation 118, in this example, may be chosen as the landing for the substantially horizontal portion 110, for example, in order to initiate completion operations such as hydraulic fracturing operations and ultimately recover hydrocarbon fluids from the subsurface formation. In some examples, the subsurface formation 118 is composed of shale or tight sandstone. Shale, in some examples, may be source rocks that provide for hydrocarbon recovery from the subsurface formation 118.

As shown in FIG. 1, the wellbore system 100 includes one or more perforation tunnels 138 (also known as perforations 138) that are formed from the wellbore 104, through the casing 122 and the cement 130, and extend into the subsurface formation 118. Generally, the perforation tunnels 138 may be formed by, for example, shaped explosive charges, water jetting, laser, or other conventional perforating techniques. In some aspects, multiple perforation tunnels 138 may comprise a perforation cluster 140. Each perforation tunnel 138, as well as each perforation cluster 140, may provide a path (or paths) for a hydraulic fracturing liquid (with or without proppant) to enter the subsurface formation 118 from the wellbore 104 in order to initiate and propagate hydraulic fractures (extending from the perforation tunnels 138) through the subsurface formation 118.

As shown in FIG. 1, the example implementation of the wellbore system 100 also includes a logging tool 126 that is communicably coupled to a downhole conveyance 136, such as a wirelines, optical line, or other data communication cable. The downhole conveyance 136 provides data from the logging tool 126 to the control system 146, for real time (for example, during logging operations) or later usage in determining a breakdown pressure of the subsurface formation 118. In some aspects, the control system 148 comprises a microprocessor based control system that includes, for example, one or more hardware processors, one or more memory storage devices (for example, tangible, non-transitory computer-readable memory modules), one or more network interfaces, and one or more input/output devices, including, for example, a graphical user interface (GUI) to present one or more determinations or data from the computer framework for determining a breakdown pressure of a subsurface formation.

Figure 2A:
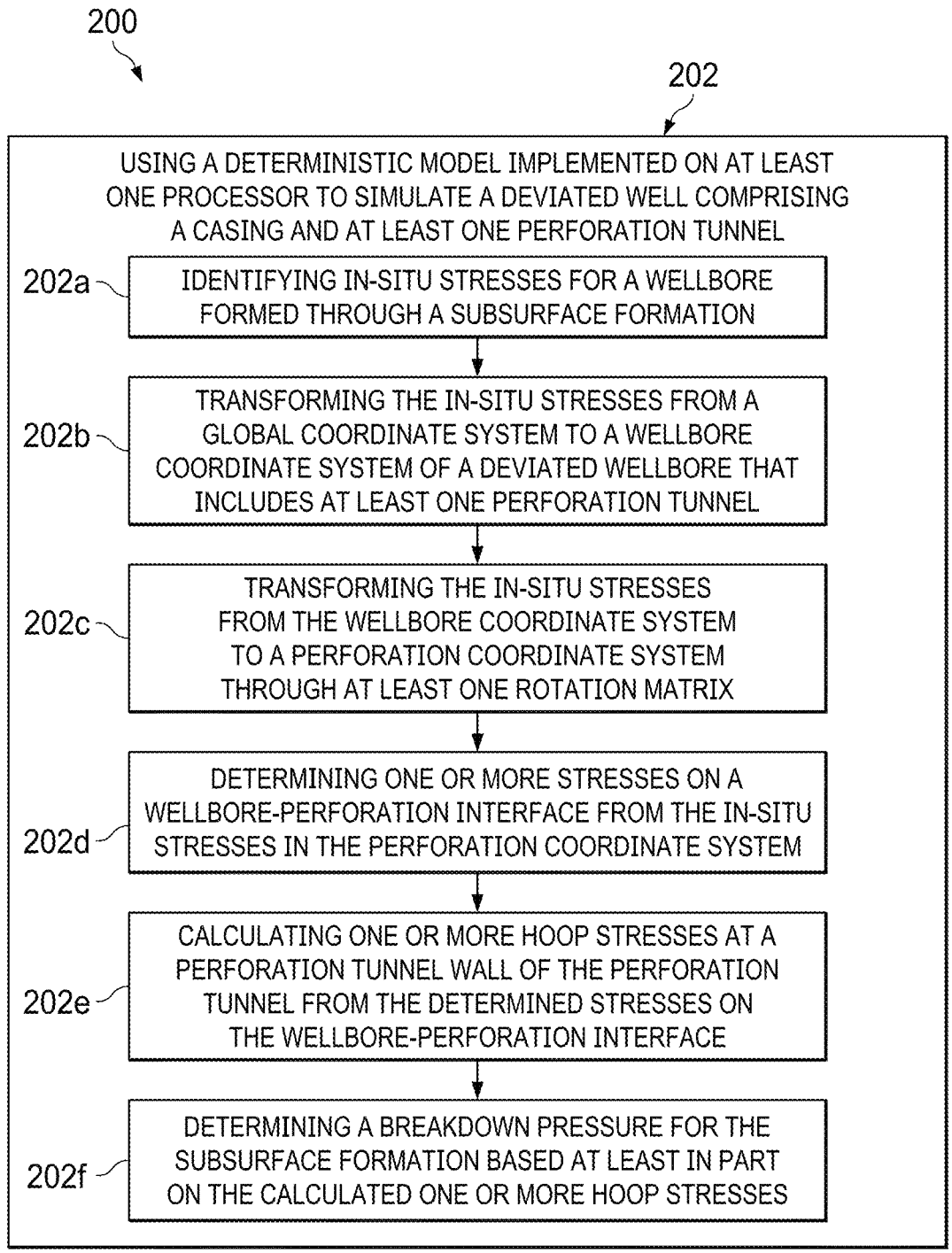
FIGS. 2A and 2B illustrate flow charts that describes an example method for determining a subsurface formation breakdown pressure according to the present disclosure.
Figure 2B:
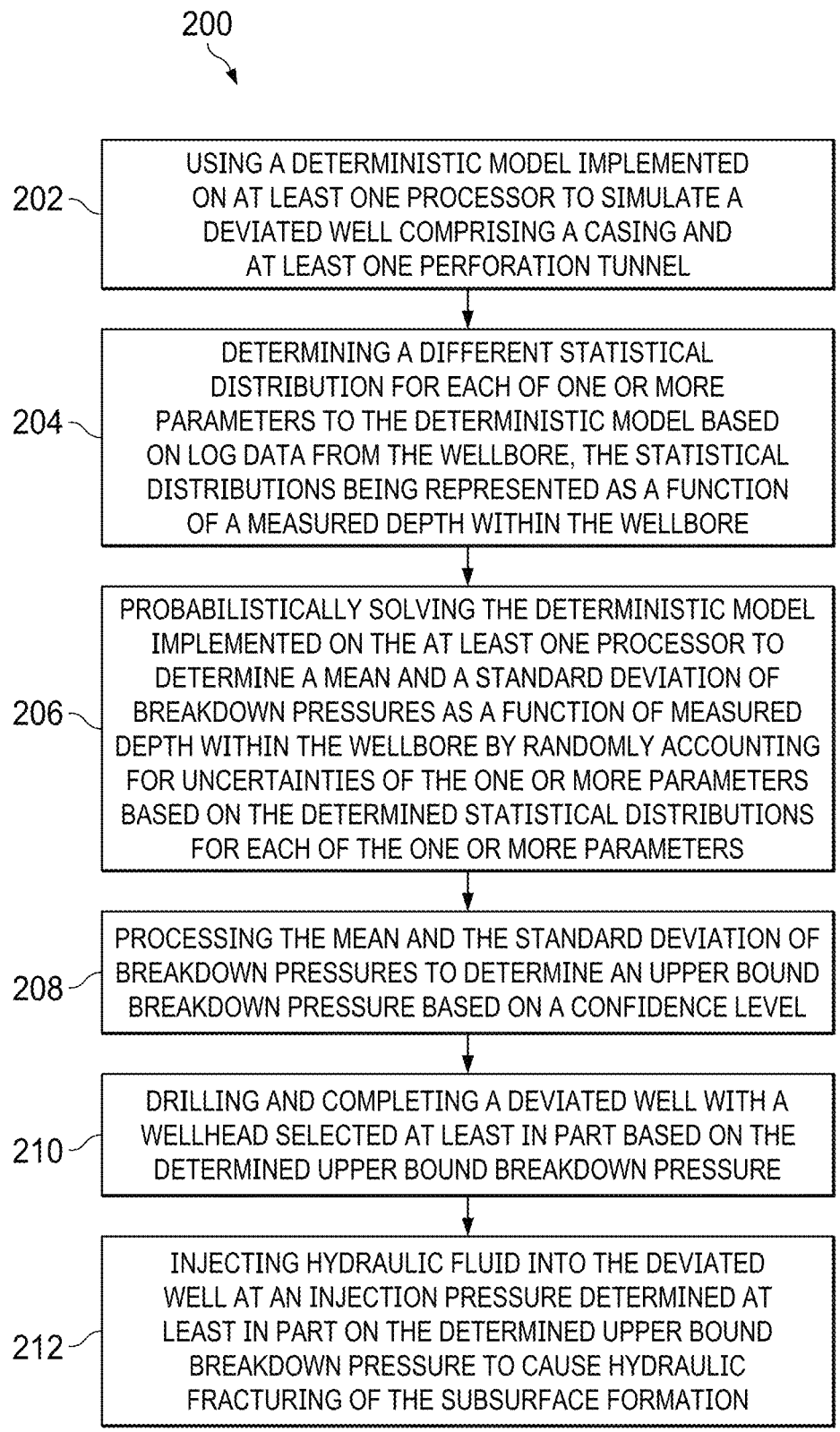

FIGS. 2A and 2B illustrate flow charts that describes an example method 200 for determining a subsurface formation breakdown pressure according to the present disclosure. In some aspects, method 200 may be performed with or by all or parts of the wellbore system 100, including the control system 146 that is communicably coupled to receive, for example, logging data about the subsurface formation 118 from the logging tool 126.

In some aspects, method 200 is part of a computational framework executed by, for instance, the control system 146, in order to determine the breakdown pressure of the subsurface formation 118 through which the wellbore 104 (for example, as a cased, cemented, deviated wellbore) is formed. For example, in some aspects, conventional hydraulic fracturing simulators cannot accurately predict the breakdown pressure due to model simplifications that may use a large mesh size. Also, such conventional simulators may not take into account or inaccurately take into account issues related to deviation of the wellbore, casing, cement, and casing-cement-formation interaction. Such conventional simulators may typically model hydraulic fractures that initiate from perforation clusters and propagate along a maximum principal stress directions of the subsurface formation as long as hydraulic fracturing fluid injection is maintained. A few conventional models are only applicable to vertical (in other words, non-deviated), open hole (in other words, without casing) wellbores. The computational framework for calculating the breakdown pressure of the present disclosure, however, is applicable to deviated, cased wellbores with clustered perforations so as to determine breakdown pressure to guide and inform hydraulic fracturing treatments.

Method 200 may begin at step 202, which includes using a deterministic model to simulate a deviated well including a casing and at least one perforation tunnel. In some implementations, using the deterministic model includes some or all of steps 202a-202f.

In some implementations, using the deterministic model begins at step 202a, which includes identifying in-situ stresses for a wellbore formed through a subsurface formation. The in-situ stresses are parameters to the deterministic model used in the uncertainty analysis described with respect to steps 204-206 below. In some aspects, the logging tool 126 may derive or generate an image log of the subsurface formation 118, from which the maximum principal stress angle of the subsurface formation 118 can be obtained. From the maximum principal stress angle and borehole image, a maximum principal stress of the subsurface formation 118 can be estimated and in-situ stresses may be calibrated and finally determined.

In some aspects, the in-situ stresses can be calculated according to a number of parameters. For example, such parameters may include wellbore True Vertical Depth (TVD), azimuth angle, and deviation angle and the image log. The parameters may also include the mechanical properties of, for example, the casing 122, the cement 130, and the subsurface formation 118 itself (for example, the tensile strength of the subsurface formation 118). In some examples, any or all of these parameters are used in the deterministic model and used in the uncertainty analysis described with respect to steps 204-206 below.

For example, an in-situ stress field of the subsurface formation 118 exists in the far field and takes the form as follows:

$$\sigma_{in} = \begin{pmatrix} \sigma_{xx} & \tau_{xy} & \tau_{xz} \\ \tau_{yx} & \sigma_{yy} & \tau_{yz} \\ \tau_{zx} & \tau_{zy} & \sigma_{zz} \end{pmatrix} \text{ or } \sigma_{Pr} = \begin{pmatrix} \sigma_{Hmax} & 0 & 0 \\ 0 & \sigma_{Hmin} & 0 \\ 0 & 0 & \sigma_V \end{pmatrix}. \tag{1}$$

In Eq. 1, $\sigma_{Hmax}$ and $\sigma_{Hmin}$ are the maximum and minimum horizontal stresses respectively, and $\sigma_V$ is the principal vertical stress component. The dynamic Young's modulus and Poisson's ratio of the subsurface formation 118 can be calculated using, for example, a sonic log from the logging tool 126, then converted to a static modulus based on correlations. The vertical stress $S_V$ (total stress) or $\sigma_V$ (effective stress) of the subsurface formation 118 can be reasonably calculated based on, for example, a density log of the logging tool 126, as:

$$S_V = \int \rho dZ, \sigma_V = S_V - \alpha P_0 \tag{2}.$$

In some examples, the static and/or dynamic Young's modulus, the static and/or dynamic Poisson's ratio, and/or the vertical stress (for example, the $S_V$ (total stress) and/or the $\sigma_V$ (effective stress)) are used as parameters in the deterministic model and used in the uncertainty analysis described with respect to steps 204-206 below.

Without considering tectonic stresses, the effective and total minimum horizontal stress can be approximately calculated by:

$$\sigma_{Hmin} = \frac{\mu}{1-\mu}\sigma_V, S_{Hmin} = \frac{\mu}{1-\mu}(\sigma_V - \alpha P_0) + \alpha P_0. \tag{3}$$

In Eq. 3, $\alpha$ is the Riot's poroelastic parameter and $P_0$ is reservoir pressure. The maximum principal stress can be estimated based on, for example, the image log by calibrating the maximum horizontal stress magnitude against a drilling fluid ("mud") weight and observed breakout and breakdown zone exhibited in the image log data.

In a conventional analysis for a vertical open hole, the maximum principal stress can be obtained based on the breakdown pressure from a leak off test during drilling. The above equation assumes the horizontal strain equal to zero. Under the tectonic regime with given horizontal strains $\varepsilon_{Hmax}$ and $\varepsilon_{Hmin}$, the maximum and minimum horizontal stresses can be generally calculated by:

$$S_{Hmin} = \frac{\mu}{1-\mu}(\sigma_V - \alpha P_0) + \alpha P_0 + \frac{E}{1-\mu^2}(\varepsilon_{Hmin} + \mu\varepsilon_{Hmax}), \quad (4)$$

$$S_{Hmax} = \frac{\mu}{1-\mu}(\sigma_V - \alpha P_0) + \alpha P_0 + \frac{E}{1-\mu^2}(\mu\varepsilon_{Hmin} + \varepsilon_{Hmax}). \quad (5)$$

In some examples, the maximum horizontal stress ($S_{Hmax}$) and/or the minimum horizontal stress ($S_{Hmin}$) is/are used as parameters in the deterministic model and used in the uncertainty analysis described with respect to steps 204-206 below.

Drilling the wellbore 104 in and through the subsurface formation 118 leads to a stress redistribution around the wellbore 104. The wellbore 104 is generally supported by drilling fluid pressure acting on the wellbore wall. Accurately estimating the stresses around the wellbore 104 may be necessary for wellbore stability. Also, it may be helpful to determine the breakdown pressure for hydraulic fracturing design, which directly impacts the selection of casing size, treatment tubing size, wellhead, steel grade, pump schedule, and other equipment.

Figure 3:
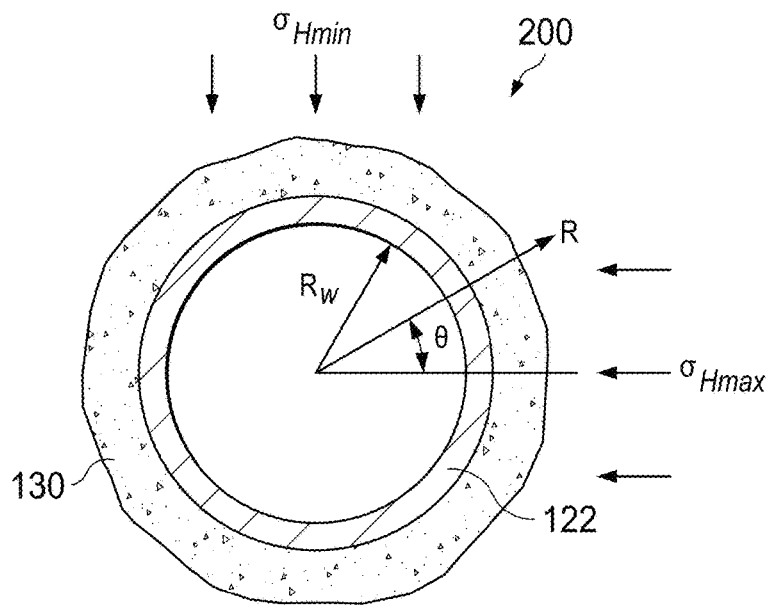
FIG. 3 illustrates a schematic view cross-section of a cased, vertical wellbore with particular stresses according to the present disclosure.

For example, FIG. 3 illustrates a schematic top view cross-section 300 of a cased, vertical wellbore with particular stresses. In cross-section 300, represents the wellbore radius, and R represents a radial distance from the concentric center of the casing 122 and cement 130, along with the effective total minimum and maximum horizontal stresses, $\sigma_{Hmax}$ and $\sigma_{Hmin}$.

For a conventional, vertical open-hole wellbore, it is a generally accepted convention that the three far field principal stresses and orientation are known for a conventional vertical, open hole wellbore. The elastic solutions of the effective stresses around wellbore based on plane strain condition are given by:

$$\sigma_r = \frac{(\sigma_{Hmax}+\sigma_{Hmin})}{2}\left(1-\frac{R_w^2}{R^2}\right)+ \quad (6),$$

$$\frac{(\sigma_{Hmax}-\sigma_{Hmin})}{2}\left(1-4\frac{R_w^2}{R^2}+3\frac{R_w^4}{R^4}\right)+(P_w-P_0)\frac{R_w^2}{R^2},$$

$$\sigma_\theta = \frac{(\sigma_{Hmax}+\sigma_{Hmin})}{2}\left(1+\frac{R_w^2}{R^2}\right)+ \quad (7).$$

$$\frac{(\sigma_{Hmax}-\sigma_{Hmin})}{2}\left(1+3\frac{R_w^4}{R^4}\right)\cos 2\theta-(P_w-P_0)\frac{R_w^2}{R^2}.$$

In Eqs. 6 and 7, $\sigma_r$ is the radial stress acting outwards from the wellbore; $\sigma_\theta$ is the hoop stress around the wellbore; $\theta$ is the angle from the direction of $\sigma_{xx}$; $P_w$ is the wellbore pressure; and $P_0$ is the reservoir pressure. In some examples, the radius of the wellbore wall ($R_w$) is used as a parameter in the deterministic model and used in the uncertainty analysis described with respect to steps 204-206 below.

For an open-hole wellbore, limiting this to the wellbore wall with R=$R_w$ leads to:

$$\sigma_r = P_w - P_0 \quad (8),$$

$$\sigma_\theta = (\sigma_{Hmax}+\sigma_{Hmin})-2(\sigma_{Hmax}-\sigma_{Hmin})\cos 2\theta-(P_w-P_0) \quad (9),$$

$$\tau_{r\theta} = 0 \quad (10).$$

For the hydraulic fracturing, tensile strength criteria is generally used to direct the fracture propagation trajectory; therefore a fracture propagates at the direction (or orientation angle) of maximum horizontal stress. In some examples, the tensile strength criteria and/or the orientation angle of maximum horizontal stress are used as parameters in the deterministic model and used in the uncertainty analysis described with respect to steps 204-206 below.

The corresponding hoop stress at $\theta$=0 yields:

$$\sigma_\theta = 3\sigma_{Hmin} - \sigma_{Hmax} - (P_w - P_0) \quad (11).$$

Breakdown pressure is determined based on tensile strength. If the hoop stress turns into tension at wellbore wall and exceeds the material's tensile strength T, the material (in other words, the rock) will fail in tensile mode:

$$\sigma_\theta = -T \quad (12),$$

$$P_w = 3\sigma_{Hmin} - \sigma_{Hmax} + P_0 + T \text{ (in terms of effective stress)} \quad (13).$$

Eq. 13 is generally used to predict the required drilling mud weight in the conventional, vertical open-hole example, which can avoid wellbore breakdown issues during drillings. For horizontal wells drilled in the subsurface formations (such as deep and tight reservoirs), the horizontal parts are generally drilled in the minimum horizontal stress direction and thereafter is cased and cemented. After perforating the casing, fluid injection is executed to initiate hydraulic fractures from the perforation towards the maximum horizontal stress direction. In such situations, the computational framework of the present disclosure may calculate the hoop stress around the perforation tunnel for judging whether fracture can be initiated or not, even though the hoop stress with respect to the wellbore is not the main concern. For a cased and cemented wellbore with perforation clusters (such as wellbore 104). The breakdown pressure refers to the bottom hole pressure inside the casing that leads to tensile failure within the area of the wellbore-perforation interface. Therefore, Eq. 13 cannot be directly used to estimate the breakdown pressure for deviated, cased wellbores with clustered perforations for a hydraulic fracturing treatment (such as wellbore 104).

In some implementations, using the deterministic model continues at step 202b, which includes transforming the in-situ stresses from a global coordinate system to a wellbore coordinate system of a deviated wellbore that includes at least one perforation tunnel. In some aspects, step 202b may also include calculating coefficient of pressure transferred, for example, from a hydraulic fracturing fluid to the subsurface formation 118 through the casing 122 and cement 130 as well as pressure loss due to perforation friction.

Figure 4A:
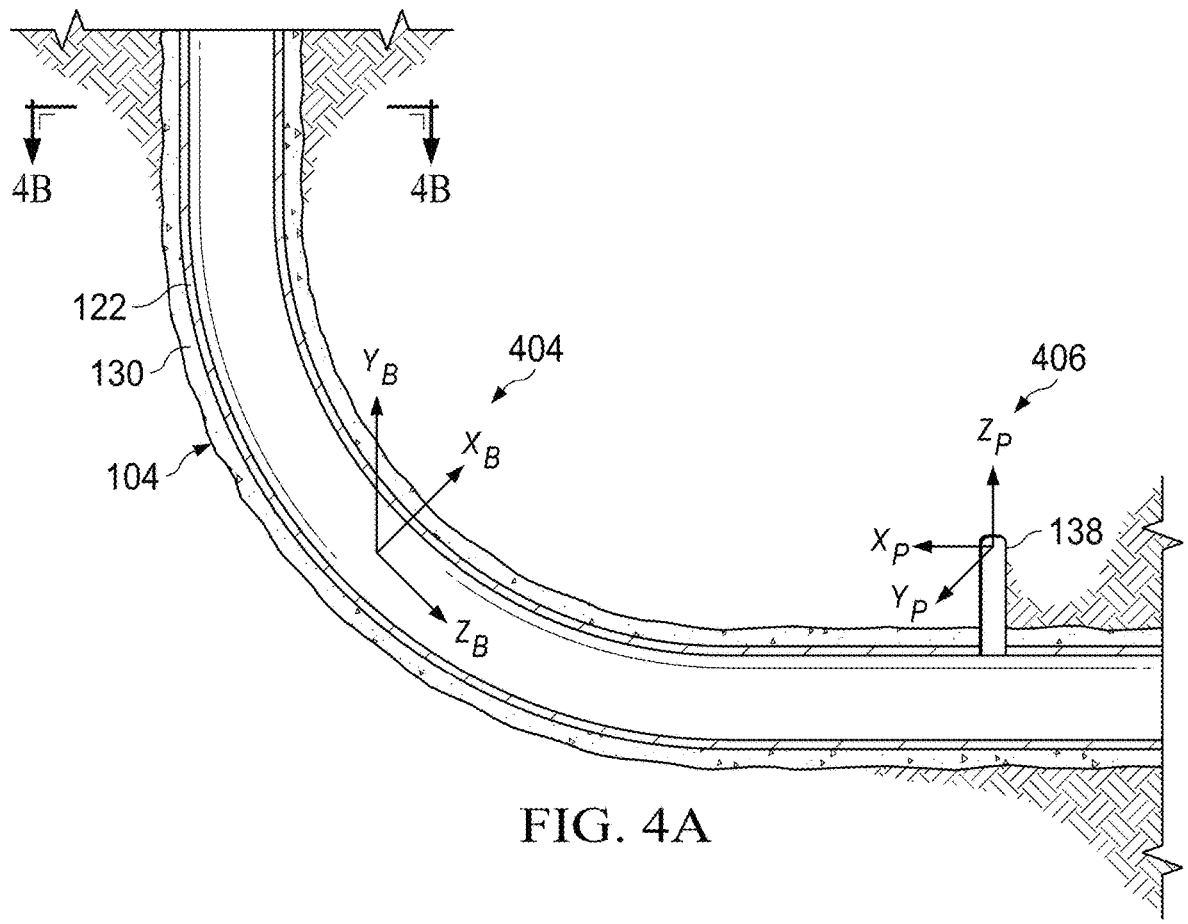
FIGS. 4A and 4B illustrate a schematic side view of a deviated wellbore that shows a series of coordinate systems used in a computational framework according to the present disclosure.
Figure 4B:
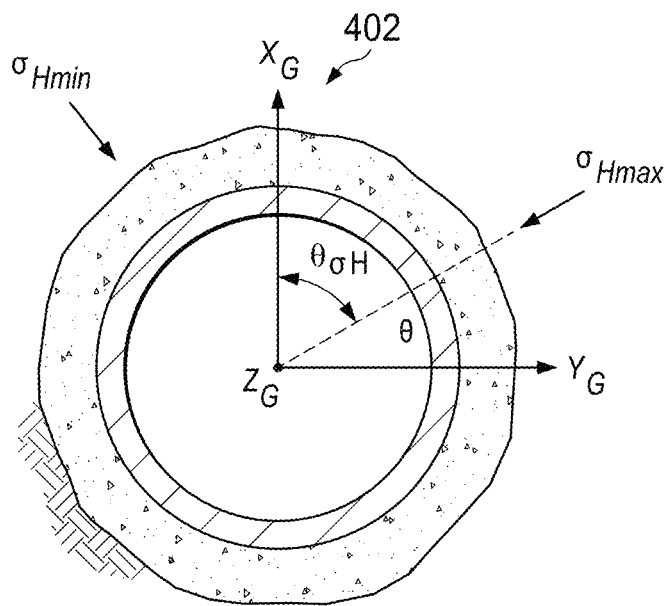

For example, for a deviated wellbore such as wellbore 104, the in-situ stresses may be transformed between different coordinate systems. For example, the in-situ stresses may be transformed from a global coordinate system to a wellbore coordinate system. FIGS. 4A and 4B illustrate a schematic side view of the wellbore 104 that includes at least one perforation tunnel 138 with overlaid coordinate systems. In the global coordinate system 402, as shown in FIG. 4B, the x-axis aligns with north (true north), the y-axis aligns with east, and the z-axis is vertically downward (for example, into the Earth). This coordinate system 402 is denoted by global coordinate system ($x_G$, $y_G$, $z_G$). In some aspects, it is assumed that the azimuth of maximum principal stress is $\theta_{\sigma_H}$, which is the angle turning clockwise from north to the maximum principle stress. Therefore, a rotation matrix is given by:

$$R_{\sigma_H \to x_G} = \begin{pmatrix} \cos\theta_{\sigma_H} & -\sin\theta_{\sigma_H} & 0 \\ \sin\theta_{\sigma_H} & \cos\theta_{\sigma_H} & 0 \\ 0 & 0 & 1 \end{pmatrix}. \quad (14)$$

In Eq. 14, $\theta_{\sigma_H}$ should be positive if the maximum principal stress, $\sigma_{Hmax}$, is clockwise to the axis, $x_G$, and is negative if it is counter clockwise to the axis, $x_G$. The equivalent stress tensor in the global coordinate system 402 that is rotated by a maximum stress angle $\theta_{\sigma_H}$ around the z-axis can be calculated by:

$$\sigma^G = R_{\sigma_H \to x_G} \sigma_{Pr} R^T_{\sigma_H \to x_G}, \quad (15)$$

$$\begin{cases} \sigma^G_{xx} = C^2_G \sigma_{Hmax} + S^2_G \sigma_{Hmin} \\ \sigma^G_{yy} = S^2_G \sigma_{Hmax} + C^2_G \sigma_{Hmin} \\ \sigma^G_{zz} = \sigma_V \\ \tau^G_{xy} = C_G S_G (\sigma_{Hmax} - \sigma_{Hmin}) \\ \tau^G_{yz} = 0 \\ \tau^G_{zx} = 0 \end{cases} \quad (16)$$

where $C_G = \cos\theta_{\sigma_H}$, $S_G = \sin\theta_{\sigma_H}$. In some aspects, this is the same as the stress rotation used in the objective stress update procedures for large deformation analysis in computational mechanics. For a well survey, any point in the well trajectory can be determined by three parameters: measured depth, wellbore deviation angle $\alpha_D$, and wellbore azimuth angle $\alpha_A$. In some examples, the measured depth, the wellbore deviation angle, and the wellbore azimuth angle are used as parameters in the deterministic model and used in the uncertainty analysis described with respect to steps 204-206 below.

A wellbore coordinate system 404 at any point along the well trajectory can be tracked and obtained by the following rotations about the global coordinate system $x_G$, $y_G$, $z_G$. For example, such rotations can include: (1) rotation of deviation angle $\alpha_D$ about the $y_G$-axis; and (2) rotation of azimuth angle $\alpha_A$ about $\alpha_G$-axis. Then, the rotation matrix is given by:

$$R_{G \to B}(\alpha_A, \alpha_D) = \quad (17)$$
$$R_y(\alpha_D) R_z(\alpha_A) = \begin{pmatrix} \cos\alpha_D & 0 & -\sin\alpha_D \\ 0 & 1 & 0 \\ \sin\alpha_D & 0 & \cos\alpha_D \end{pmatrix} \begin{pmatrix} \cos\alpha_A & \sin\alpha_A & 0 \\ -\sin\alpha_A & \cos\alpha_A & 0 \\ 0 & 0 & 1 \end{pmatrix}.$$

Eq. 17 may lead to:

$$R_{G \to B}(\alpha_A, \alpha_D) = \begin{pmatrix} \cos\alpha_D \cos\alpha_A & \cos\alpha_D \sin\alpha_A & -\sin\alpha_D \\ -\sin\alpha_A & \cos\alpha_A & 0 \\ \sin\alpha_D \cos\alpha_A & \sin\alpha_D \sin\alpha_A & \cos\alpha_D \end{pmatrix}. \quad (18)$$

Then, the in-situ stress tensor along the wellbore trajectory (in other words, the trajectory of wellbore 104) can be projected onto the wellbore coordinate system 404 by:

$$\sigma^{B,I} = R_{G \to B}(\alpha_A, \alpha_D) \sigma^G R^T_{G \to B}(\alpha_A, \alpha_D) = \begin{pmatrix} \sigma^{B,I}_{xx} & \tau^{B,I}_{xy} & \tau^{B,I}_{xz} \\ \tau^{B,I}_{yz} & \sigma^{B,I}_{yy} & \tau^{B,I}_{yz} \\ \tau^{B,I}_{zx} & \tau^{B,I}_{zy} & \sigma^{B,I}_{zz} \end{pmatrix}. \quad (19)$$

In Eq. 19, the superscript I represents the far field in-situ stress. Due to the lengthy expression of the stress components, the exact analytical expressions of Eq. 19 are not provided here but can be directly calculated through computer implementation.

The rotation matrix about the y-axis of the wellbore coordinate system 404 is given by:

$$R(\alpha_{y,B}) = \begin{pmatrix} \cos\alpha_{y,B} & 0 & -\sin\alpha_{y,B} \\ 0 & 1 & 0 \\ \sin\alpha_{y,B} & 0 & \cos\alpha_{y,B} \end{pmatrix}. \quad (20)$$

Thus, at the culmination of step 202b, the in-situ stresses are transformed from a global coordinate system to a wellbore coordinate system. In some examples, the deviation angle $\alpha_D$ about the $y_G$-axis and/or the azimuth angle $\alpha_A$ about $z_G$-axis are used as parameters in the deterministic model and used in the uncertainty analysis described with respect to steps 204-206 below.

In some implementations, using the deterministic model continues at step 202c, which includes transforming the in-situ stresses from the wellbore coordinate system 404 to a perforation coordinate system 406 through at least one rotation matrix. For example, in sonic aspects, rotating they axis of the wellbore coordinate system 404 at any point along the wellbore axis by $\alpha_{y,B} = \pi/2$, generates a particular perforation coordinate system 406. The corresponding rotation matrix is:

$$R_{B \to P}\left(\alpha_{y,B} = \frac{\pi}{2}\right) = \begin{pmatrix} 0 & 0 & -1 \\ 0 & 1 & 0 \\ 1 & 0 & 0 \end{pmatrix} = R^1_{B \to P}. \quad (21)$$

Figure 5:
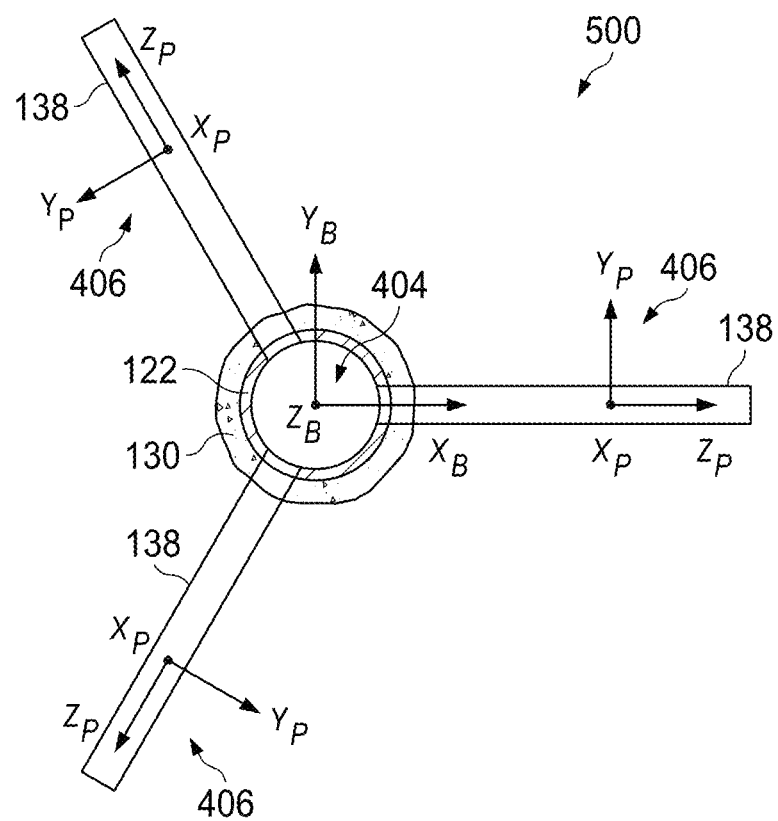
FIG. 5 illustrates a schematic view cross-section of a cased, deviated wellbore that includes perforation tunnels with an overlaid perforation coordinate system at each perforation tunnel according to the present disclosure.

For example, FIG. 5 illustrates a schematic isometric view cross-section 500 of wellbore 104 that includes perforation tunnels 138 with an overlaid perforation coordinate system 406 at each perforation tunnel 138. As shown in cross-section 500, the perforation coordinate system 406 for different phase angles of perforation tunnels 138 can be rotated, for example, by: (1) rotating perforation phase angle $\alpha_{y,B} = \pi/2$ about the $y_B$-axis of the wellbore coordinate system 404; and (2) rotation of phase angle $\alpha_{z,B}$ about the $z_B$-axis of the wellbore coordinate system 404. In some aspects, for clustered perforations with a known perforation phase angle (for example, both phase angles about the $y_B$-axis and the $z_B$-axis are known), the rotation matrix from the wellbore coordinate system 404 ($x_B$, $y_B$, $z_B$) to the perforation coordinate system 406 ($x_P y_P z_P$) can be sequentially obtained by:

$$R_{B \to P}(\alpha_{z,B}, \alpha_{y,B}) = R^1_{B \to P} R_{z,B}(\alpha_{z,B}) = \begin{pmatrix} 0 & 0 & -1 \\ \sin\alpha_{Z,B} & \cos\alpha_{Z,B} & 0 \\ \cos\alpha_{Z,B} & \sin\alpha_{Z,B} & 0 \end{pmatrix}. \quad (22)$$

In Eq. 22, $\alpha_{z,B}$ is the perforation phase angle rotating about the wellbore axis-z, which ranges from 0° to 360° and starts from the highest point of a wellbore cross section. Thus, at the culmination of step 202c, the in-situ stresses are transformed from the wellbore coordinate system to a perforation coordinate system. In some examples, the phase angle about the $y_B$-axis and/or the phase angle about the $z_B$-axis are used as parameters in the deterministic model and used in the uncertainty analysis described with respect to steps 204-206 below.

In some implementations, using the deterministic model continues at step 202d, which includes determining one or more stresses (for example, a stress state) on a wellbore-perforation interface from the in-situ stresses (for example, and other contributed components) in the perforation coordinate system. For example, for wellbore 104, bottom hole pressure may act on the perforation tunnels 138 through two ways: (1) downhole pressure may be partially and radially transferred to the subsurface formation 118 through the casing 122-cement 130 layer(s) and eventually pressurize the subsurface formation 118, which induces stresses around the borehole-perforation interface; and (2) injecting fluid flows into the perforation tunnel 138 from the casing 122 and pressurizing the perforation wall directly.

Figure 6:
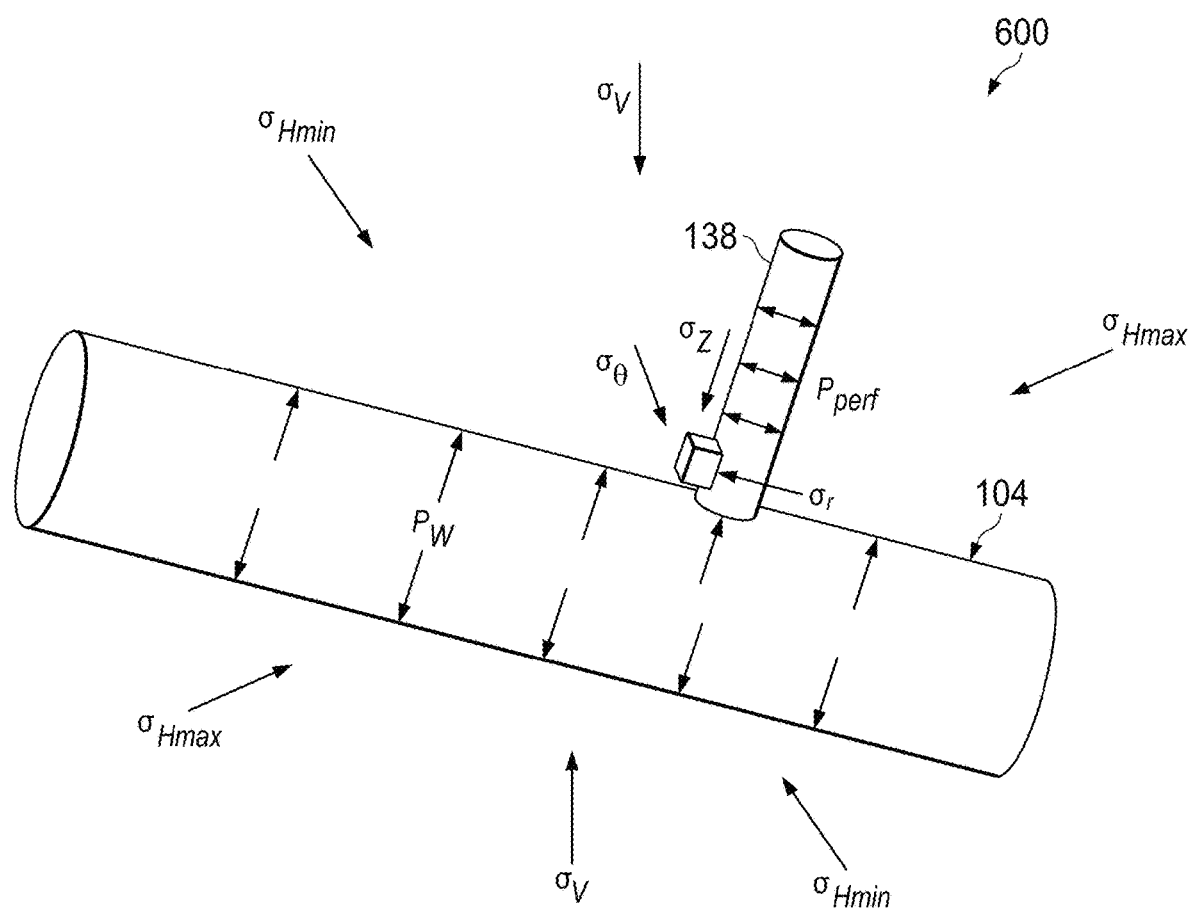
FIG. 6 illustrates a schematic isometric view of a portion of a wellbore with a perforation tunnel and loading cases according to the present disclosure.
Figure 7:
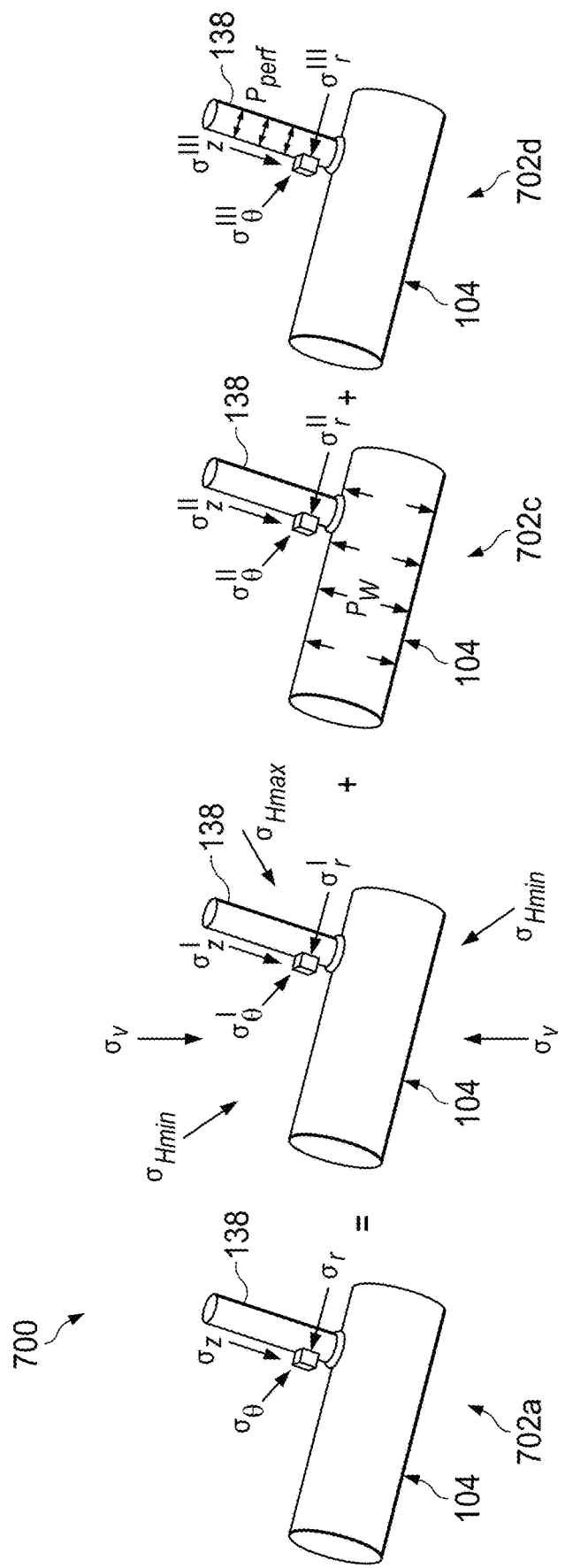
FIG. 7 illustrates an equation illustrated by a series of schematic isometric views of a portion of a wellbore with a perforation tunnel and particular acting pressures used to calculate a total effective stress through stress superposition according to the present disclosure.

In some aspects of the computational framework of method 200 (and step 202d), the deformation is limited to linear elasticity. Thus, the total stresses can be summed up (for example, superimposed) once the corresponding stresses induced by each load are calculated. For example, FIG. 6 illustrates a schematic isometric view 600 of a portion of the wellbore 104 with a particular perforation tunnel 138 and particular stresses and acting pressures. More specifically, view 600 shows the pressure loads that may be included to estimate the induced stresses around the wellbore-perforation interface. The induced stresses are also shown in FIG. 7, which illustrates an equation illustrated by a series 700 of schematic isometric views (702a, 702b, 702c, 702d) of a portion of wellbore 104 with a particular perforation tunnel 138 and particular stresses and pressures used to calculate a total effective stress through stress superposition. First, the stresses around the perforation tunnel 138 are induced by the far-field in-situ stress tensor (702b). Second, the borehole bottom hole pressure $P_w$ can be partially and radially transferred to the rock of the subsurface formation 118 through the casing 122 and cement 130, which generates additional stresses over the wellbore-perforation interface (702c). Third, the pressure $P_{perf}$ inside the perforation tunnel 138 induces stresses around the perforation tunnel 138, which may be a driving force to counter the combining stresses by the first and second parts and initiate a longitudinal fracture along the perforation tunnel 138 (702d).

In some aspects, the fluid pressure inside the perforation tunnel 138 might be different from the bottom hole pressure $P_w$ inside the casing 122 if the perforation friction is not negligible. The resulting induced stresses by these loads are denoted by superscript as $\sigma^I$, $\sigma^{II}$, and $\sigma^{III}$, respectively, which are shown in FIG. 7. In some examples, the perforation friction is used as a parameter in the deterministic model and used in the uncertainty analysis described with respect to steps 204-206 below.

From a mechanics point of view, the breakdown pressure of a perforation is a three dimensional mechanics problem and may be difficult to obtain a closed form analytical solution. Thus, in some aspects, the computational framework of method 200 may take a similar approximation of plane strain condition (satisfying the Kirsch equation) for the perforation tunnel 138. This approximation is feasible, because a ratio of perforation length to perforation diameter (L/D) is generally large in a real world example.

The breakdown pressure may be estimated based on the stress state at the perforation base, which is at the wellbore-perforation interface (for example, where the perforation 138 meets the wellbore 104) as marked in FIG. 7. The breakdown pressure refers to the bottom hole pressure $P_w$, whenever the hoop stress around the perforation base exceeds the tensile strength T of the rock of the subsurface formation 118. Based on the principle of stress superposition as shown in FIG. 7, the total effective stresses (702a) with respect to the perforation coordinate system are induced by the three parts as follows:

$$\sigma^P = \sigma^{P,i} + \sigma^{P,II} + \sigma^{P,III} \qquad (23).$$

In Eq. 23, the superscript P refers to the perforation coordinate system 406 and superscripts I, II, III refer to the three loading cases (702b, 702c, 702d). The far field in-situ stress tensor $\sigma^{P,I}$ around the perforation base in the perforation coordinate system 406 ($x_P$, $y_P$, $z_P$) is obtained as follows:

$$\sigma^{P,I} = R_{B \to P}(\alpha_{z,B}, \alpha_{y,B}) \sigma^{B,I} R_{B \to P}^T(\alpha_{z,B}, \alpha_{y,B}) = \begin{pmatrix} \sigma_{xx}^{P,I} & \tau_{xy}^{P,I} & \tau_{xz}^{P,I} \\ \tau_{yx}^{P,I} & \sigma_{yy}^{P,I} & \tau_{yz}^{P,I} \\ \tau_{zx}^{P,I} & \tau_{zy}^{P,I} & \sigma_{zz}^{P,I} \end{pmatrix}. \qquad (24)$$

Due to the lengthy expressions for the stress components, the exact analytical expressions are not provided here either and will be directly calculated in computer implementation. Based on Eq. 22, the far-field in-situ stresses in the perforation coordinate system 406 can be expressed in terms of stress tensor $\sigma^B$ as follows $$\begin{cases} \sigma_{xx}^{P,I} = \sigma_{zz}^{B,I} \\ \sigma_{yy}^{P,I} = S_{\alpha_{z,B}}^2 \sigma_{xx}^{B,I} + C_{\alpha_{z,B}}^2 \sigma_{yy}^{B,I} + 2 C_{\alpha_{z,B}} S_{\alpha_{z,B}} \tau_{xy}^{B,I} \\ \sigma_{zz}^{P,I} = C_{\alpha_{z,B}}^2 \sigma_{xx}^{B,I} + S_{\alpha_{z,B}}^2 \sigma_{yy}^{B,I} + 2 C_{\alpha_{z,B}} S_{\alpha_{z,B}} \tau_{xy}^{B,I} \\ \tau_{xy}^{P,I} = -S_{\alpha_{z,B}} \tau_{xz}^{B,I} - C_{\alpha_{z,B}} \tau_{yz}^{B,I} \\ \tau_{yz}^{P,I} = S_{\alpha_{z,B}} C_{\alpha_{z,B}} (\sigma_{xx}^{B,I} + \sigma_{yy}^{B,I}) + \tau_{xy}^{B,I} \\ \tau_{zx}^{P,I} = -C_{\alpha_{z,B}} \tau_{xz}^{B,I} - S_{\alpha_{z,B}} \tau_{yz}^{B,I} \end{cases} \qquad (25).$$

In Eq. 25, $C_{\alpha_{z,B}} = \cos \alpha_{z,B}$, $S_{\alpha_{z,B}} = \sin \alpha_{z,B}$.

Figure 8:
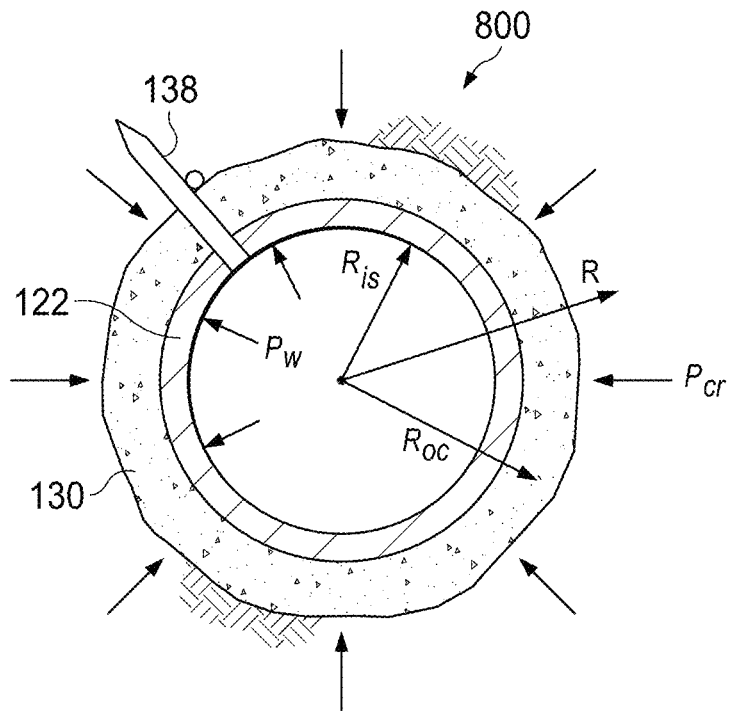
FIG. 8 illustrates a schematic view cross-section of a cased, deviated wellbore with casing and cement and particular pressures according to the present disclosure.
Figure 9:
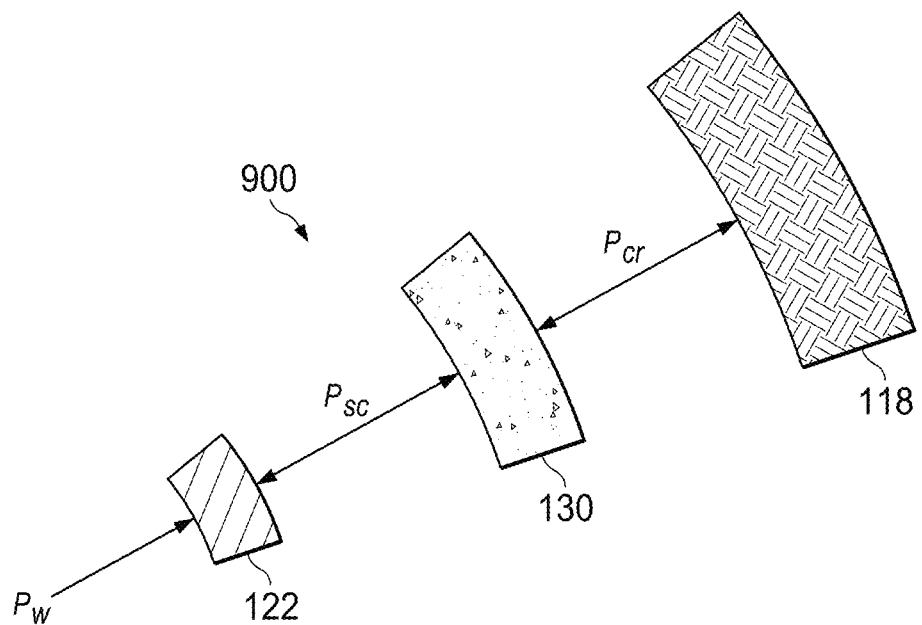
FIG. 9 illustrates an exploded schematic view of a radial section of a cased, deviated wellbore with casing and cement and particular pressures according to the present disclosure.

In some aspects, step 202d may also include taking into account the impacts of the casing 122 and the cement 130 on the formation breakdown pressure. For example, as opposed to an open hole completion in which a downhole pressure will directly act on the rock of the subsurface formation, for a cased wellbore such as the wellbore 104, the bottom hole pressure $P_w$ inside the casing 122 can be partially and radially transferred to the rock of the subsurface formation 119 through the casing 122 and the cement 130, which generate additional stresses over the wellbore-perforation interface. For example, FIGS. 8-9 illustrate these additional stresses. FIG. 8 illustrates a schematic top view cross-section 800 of the wellbore 104 with casing 122 and cement 130 and the additional stresses, which is dependent on the magnitude of $P_{cr}$ and related to the casing-cement-formation interaction. FIG. 9 illustrates an exploded schematic view 900 of a radial section of wellbore 104 with casing 122 and cement 130 and the additional pressure.

As shown in these figures, $R_{is}$ represents the casing inside radius, $R_{oc}$ represents the cement outer radius, wellbore radius $R_w=R_{oc}$, fluid pressure is inside the casing 122, casing-cement interface pressure is $P_{sc}$, and $P_{cr}$ is pressure between the cement 130 and the rock of subsurface formation 118. In some aspects, the casing-cement-rock are assumed to be fully bonded without slip in this computational framework of method 200. In some examples, the casing inside radius ($R_{is}$) and/or the casing outside radius ($R_{oc}$) are used as parameters in the deterministic model and used in the uncertainty analysis described with respect to steps 204-206 below.

The casing-cement-rock interaction results in the final interface pressure acting on the subsurface formation 118, which should be less than inside casing pressure, $P_w$. In order to estimate this part induced stresses, the computational framework of method 200 establishes an analytical elastic solution for calculating the cement-formation interface pressure, $P_{cr}$. For example, the internal pressure loading of the casing 122 can be considered as an axisymmetric plane strain problem even for a deviated well trajectory such as wellbore 104. After removing the in-situ stresses effect, the analytical solution for the cement-formation interface pressure $P_{cr}$ can be obtained as follows:

$$P_{cr} = \frac{-C_{21}b_1 P_w}{C_{11}C_{22} - C_{21}C_{12}} = \beta_{cr} P_w \quad (26)$$

In Eq. 26:

$$C_{11} = \frac{(1+\mu_s)\left[(1-2\mu_s)R_{os}^2 + R_{is}^2\right]R_{os}}{R_{os}^2 - R_{is}^2} + \frac{E_s(1+\mu_s)\left[(1-2\mu_s)R_{oc}^2 + R_{ic}^2\right]R_{ic}}{E_c(R_{oc}^2 - R_{ic}^2)}, \quad (27)$$

$$C_{12} = -\frac{2E_s(1-\mu_c^2)R_{oc}^2 R_{ic}}{E_c(R_{oc}^2 - R_{ic}^2)}, \quad (28)$$

$$C_{21} = -\frac{2E_f(1-\mu_c^2)R_{ic}^2 R_{oc}}{E_c(R_{oc}^2 - R_{ic}^2)}, \quad (29)$$

$$C_{22} = \frac{E_f(1+\mu_c)\left[(1-2\mu_c)R_{oc}^2 + R_{ic}^2\right]R_{oc}}{E_c(R_{oc}^2 - R_{ic}^2)} + (1+\mu_f)R_w, \quad (30)$$

$$b_1 = \frac{2(1-\mu_s^2)R_{is}^2 R_{os}}{(R_{oc}^2 - R_{ic}^2)}, \quad (31)$$

$$\beta_{cr} = \frac{-C_{21}b_1}{C_{11}C_{22} - C_{21}C_{12}}. \quad (32)$$

In the above equations, subscript "s" refers to the casing, "f" refers to the formation or rock, and "c" refers to the cement. In some examples, any or all of the variables used in Eqs. 26-32 are used as parameters in the deterministic model and used in the uncertainty analysis described with respect to steps 204-206 below. After obtaining the magnitude of pressure acting on the rock transferred through the casing 122 and cement 130, it can be approximately assumed that an axisymmetric plane strain condition exists along the wellbore axis direction under the load of interface pressure. Thus, the stress distribution near the wellbore 104 can be given as follows:

$$\begin{cases} \sigma_R^{B,II} = P_{cr}\dfrac{R_{oc}^2}{R^2} \\ \sigma_\theta^{B,II} = -P_{cr}\dfrac{R_{oc}^2}{R^2} \end{cases}. \quad (33)$$

Figure 10:
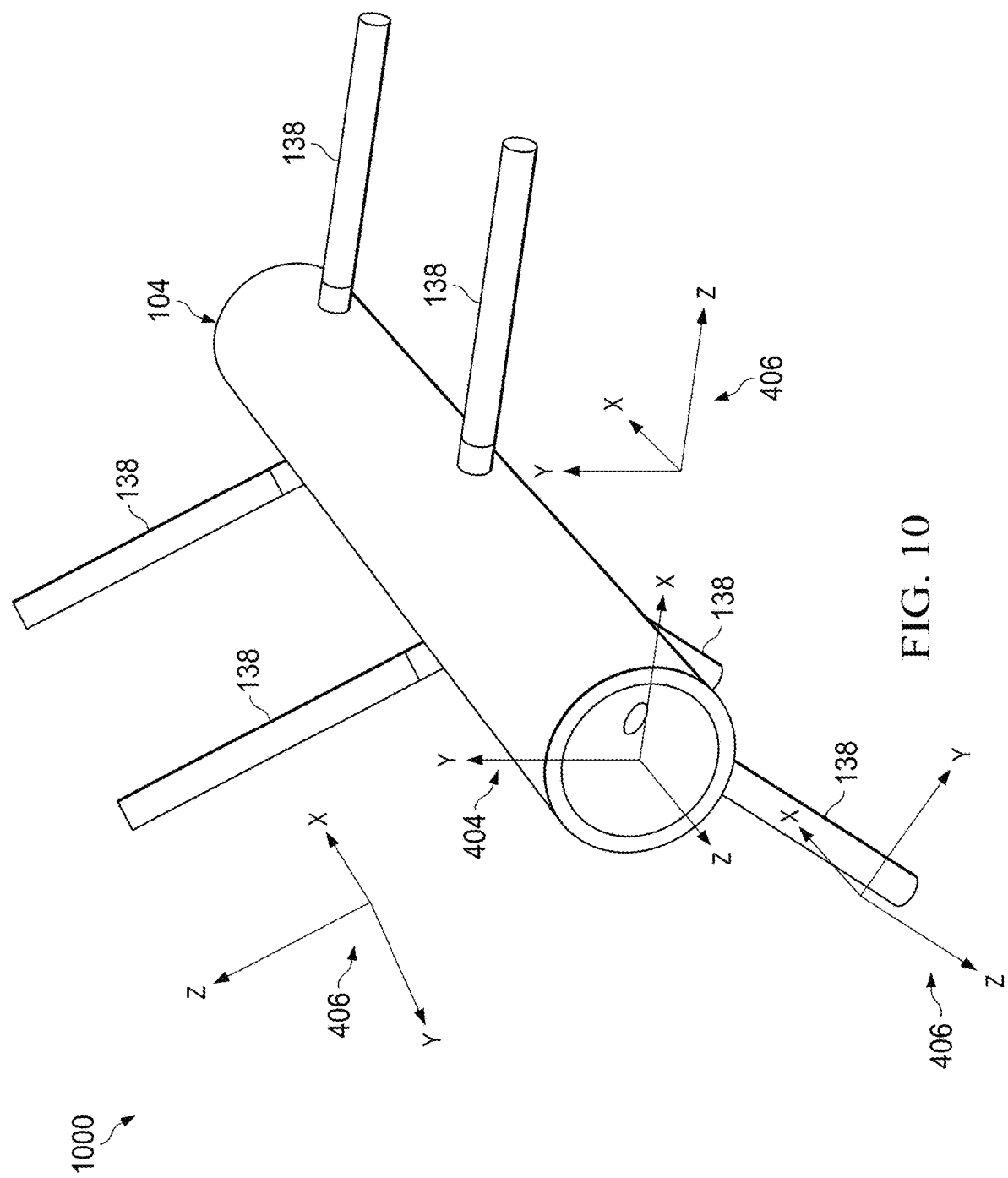
FIG. 10 illustrates an isometric view of a wellbore and perforation tunnels with overlaid coordinate systems for the wellbore and perforation tunnels according to the present disclosure.

The above radial and circumferential stresses are constant regardless of angle θ about the axis of wellbore 104. This is convenient for applying stress superposition to calculate the total breakdown pressure when projecting them onto the perforation coordinate systems 406 (for example, as shown in FIGS. 5, 8, 9). In some aspects, the stress components of $\sigma_R^{B,II}$, $\sigma_\theta^{B,II}$ and $\sigma_Z^{B,II}$ are calculated with respect to the wellbore 104, which has a different orientation (and coordinate system 404) from the perforation coordinate system 406 ($x_P$, $y_P$, $z_P$) as shown in FIG. 10 (and FIG. 4A). For example, FIG. 10 illustrates an isometric view 1000 of the wellbore 104 (for example, horizontal portion 110) with perforation tunnels 138 and overlaid coordinate systems for the wellbore 104 and perforation tunnels 138.

As shown in FIG. 10 (and FIG. 4A), in the perforation coordinate system 406 ($x_P$, $y_P$, $z_P$), $\sigma_\theta^{B,II}$ aligns in the same direction of the $y_P$-axis, $\sigma_Z^{B,II}$ aligns in the direction of the $x_P$-axis, and $\sigma_R^{B,II}$ aligns in the direction of $z_P$-axis. Based on the orientations of the coordinate systems attached to wellbore and perforations as shown in these figures, it leads to the following relationships:

$$\sigma_{xx}^{P,II} = \sigma_{zz}^{B,II} = 0, \quad (34)$$

$$\sigma_{yy}^{P,II} = \sigma_{\theta\theta}^{B,II} = -P_{cr}\frac{R_{oc}^2}{R^2} = -P_{cr}, \quad (35)$$

$$\sigma_{zz}^{P,II} = \sigma_{rr}^{B,II} = P_{cr}\frac{R_{oc}^2}{R^2} = P_{cr}. \quad (36)$$

Calculation of $\sigma^{III}$ stress tensor around the perforation tunnel 138 (for example at the perforation interface) may be related to the fluid pressure inside the perforation tunnel 138. For each perforation tunnel 138, it can be reasonably considered as an axisymmetric loading case and with a plane strain condition along the perforation axis, $z_P$. Therefore, the expression is the same to Eq. 33, but the radial direction should be in the perforation radial direction (and it is also differentiated by lower case r):

$$\sigma_r^{P,II} = P_{perf}\frac{r_p^2}{r^2} \text{ and } \sigma_\theta^{P,III} = -P_{perf}\frac{r_p^2}{r^2}. \quad (37)$$

To calculate the fluid pressure acting on the perforation tunnel 138, the pressure loss across the perforation entry is accounted for, which may be important for hydraulic fracturing pump schedule design. For example, a sharp-edge orifice equation may be used to estimate the pressure drop as follows:

$$\Delta P_{perf} = \frac{0.2369\rho}{d^4 C_d^2}\left(\frac{Q}{N}\right)^2, \quad (38)$$

where ρ is fluid density in lb/gal; d is the initial perforation diameter in inches; $C_d$ is the perforation coefficient of discharge; Q is the flow rate in bbl/min; and N is the number of perforation tunnels 138. In some examples, the fluid density (ρ), the initial perforation diameter (d), the perforation coefficient of discharge ($C_d$), the flow rate (Q), and/or the number of perforation tunnels (N) are used as parameters in the deterministic model and used in the uncertainty analysis described with respect to steps 204-206 below.

The total fluid pressure inside the perforation tunnel may be expressed as:

$$P_{perf} = P_w - \Delta P_{perf} = \beta_{perf} P_w, \quad (39)$$

$$\beta_{perf} = 1 - \frac{0.2369\rho}{d^4 C_d^2}\left(\frac{Q}{N}\right)^2. \quad (40)$$

In Eq. 39, $\beta_{perf} \in [0, 1]$ represents a perforation fraction of wellbore pressure effectively transferred to a perforation hole and that acts on the perforation wall to counter the induced hoop stresses by in-situ stresses and $P_{cr}$, and initiate the hydraulic fracture. Before rock breakdown and fracture initiation, $P_{perf}$ can be assumed to be equal to wellbore pressure, $P_w$, if friction loss is negligible. Otherwise, the internal pressure acting on a perforation wall may be adjusted based on the perforation quality. For example, perforation quality (for example, accounted for by $\beta_{perf}$) can significantly impact the breakdown issue, which may be accounted for calculating breakdown pressure.

Figure 11:
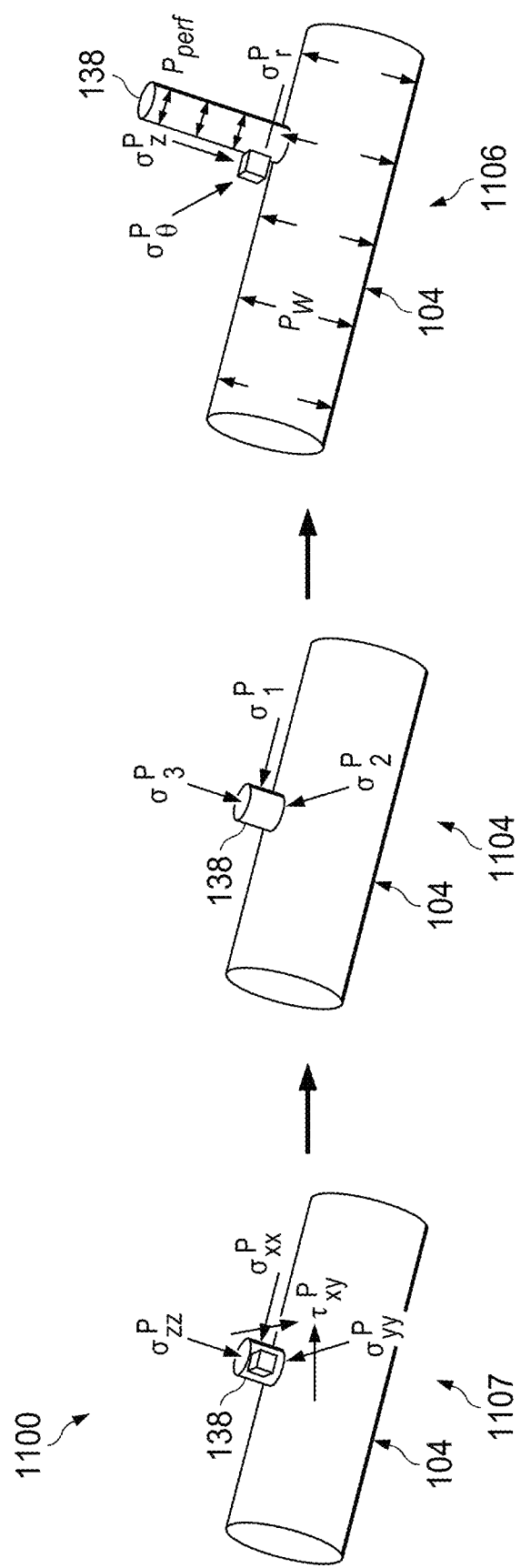
FIG. 11 illustrates a series of schematic isometric views of a portion of a wellbore with a perforation tunnel and particular stresses used to calculate a hoop stress around the perforation tunnel according to the present disclosure.

In some implementations, using the deterministic model continues at step 202e, which includes calculating one or more hoop stresses at a perforation tunnel wall of the perforation tunnel from the determined stresses on the wellbore-perforation interface. For example, in some aspects, the determined stresses from step 202d are used to calculate the hoop stresses at the wellbore-perforation interface. For instance, FIG. 11 illustrates a series 1100 of schematic isometric views (1102, 1104, 1106) of a portion of the wellbore with a particular perforation tunnel 138 and particular stresses used to calculate a hoop stress around the perforation tunnel 138. View 1102 shows a first sub-step of the step 202f, which includes adding the induced stresses of loading cases I and II (702b and 702c) together. Limiting $R=R_{oc}=R_w$ results in the stresses within the perforation-wellbore interface as follows:

$$\begin{cases} \sigma_{xx}^{P,I-II} = \sigma_{xx}^{P,I} + \sigma_{xx}^{P,II} = \sigma_{zz}^{B,I} + \sigma_{zz}^{B,II} = \sigma_{zz}^{B,I} \\ \sigma_{yy}^{P,I-II} = \sigma_{yy}^{P,I} + \sigma_{yy}^{P,II} = S_{\alpha_{z,B}}^2 \sigma_{xx}^{B,I} + C_{\alpha_{z,B}}^2 \sigma_{yy}^{B,I} + 2C_{\alpha_{z,B}} S_{\alpha_{z,B}} \tau_{xy}^{B,I} - P_{cr} \\ \sigma_{zz}^{P,I-II} = \sigma_{zz}^{P,I} + \sigma_{rr}^{P,II} = C_{\alpha_{z,B}}^2 \sigma_{xx}^{B,I} + S_{\alpha_{z,B}}^2 \sigma_{yy}^{B,I} + 2C_{\alpha_{z,B}} S_{\alpha_{z,B}} \tau_{xy}^{B,I} + P_{cr} \\ \tau_{xy}^{P,I-II} = -S_{\alpha_{z,B}} \tau_{xz}^{B,I} - C_{\alpha_{z,B}} \tau_{yz}^{B,I} \\ \tau_{yz}^{P,I-II} = S_{\alpha_{z,B}} C_{\alpha_{z,B}} (\sigma_{xx}^{B,I} + \sigma_{yy}^{B,I}) + \tau_{xy}^{B,I} \\ \tau_{zx}^{P,I-II} = -C_{\alpha_{z,B}} \tau_{xz}^{B,I} - S_{\alpha_{z,B}} \tau_{yz}^{B,I} \end{cases} \quad (41)$$

For the purpose of mathematical symbolic simplification and computer implementation, Eq. 41 can be further simplified as:

$$\begin{cases} \sigma_{xx}^{P,I-II} = S_{xx}^0 \\ \sigma_{yy}^{P,I-II} = S_{yy}^0 - P_{cr} = S_{yy}^0 - \beta_{cr} P_w \\ \sigma_{zz}^{P,I-II} = S_{zz}^0 P_{cr} = S_{zz}^0 + \beta_{cr} P_w \\ \tau_{xy}^{P,I-II} = T_{xy}^0 \\ \tau_{yz}^{P,I-II} = T_{yz}^0 \\ \tau_{zx}^{P,I-II} = T_{zx}^0 \end{cases} \quad (42)$$

-continued $$\begin{cases} S_{xx}^0 = \sigma_{zz}^{B,I} \\ S_{yy}^0 = S_{\alpha_{z,B}}^2 \sigma_{xx}^{B,I} + C_{\alpha_{z,B}}^2 \sigma_{yy}^{B,I} + 2C_{\alpha_{z,B}} S_{\alpha_{z,B}} \tau_{xy}^{B,I} \\ S_{zz}^0 = C_{\alpha_{z,B}}^2 \sigma_{xx}^{B,I} + S_{\alpha_{z,B}}^2 \sigma_{yy}^{B,I} + 2C_{\alpha_{z,B}} S_{\alpha_{z,B}} \tau_{xy}^{B,I} \\ T_{xy}^0 = -S_{\alpha_{z,B}} \tau_{xz}^{B,I} - C_{\alpha_{z,B}} \tau_{yz}^{B,I} \\ T_{yz}^0 = S_{\alpha_{z,B}} C_{\alpha_{z,B}} (\sigma_{xx}^{B,I} + \sigma_{yy}^{B,I}) + \tau_{xy}^{B,I} \\ T_{zx}^0 = -C_{\alpha_{z,B}} \tau_{xz}^{B,I} - S_{\alpha_{z,B}} \tau_{yz}^{B,I} \end{cases} \quad (43)$$

Eq. 43 gives the stresses acting on the wellbore-perforation interface (as shown in FIG. 7), which are induced by the far field in-situ stresses and interface pressure $P_{cr}$.

View 1104 shows a second sub-step of the step 202f, which includes calculating the local maximum and minimum stresses in the perforation base due to loading cases I and II. The local principal stresses in the perforation coordinate system plane, $x_P y_P$, on the wellbore-perforation interface that surrounds the perforation tunnel can be given by:

$$\begin{cases} \sigma_{max}^P = \frac{\sigma_{xx}^{P,I-II} + \sigma_{yy}^{P,I-II}}{2} + \sqrt{\left(\frac{\sigma_{xx}^{P,I-II} - \sigma_{yy}^{P,I-II}}{2}\right)^2 + (\tau_{xz}^{P,I-II})^2} \\ \sigma_{min}^P = \frac{\sigma_{xx}^{P,I-II} + \sigma_{yy}^{P,I-II}}{2} - \sqrt{\left(\frac{\sigma_{xx}^{P,I-II} - \sigma_{yy}^{P,I-II}}{2}\right)^2 + (\tau_{xz}^{P,I-II})^2} \end{cases}, \text{or} \quad (44)$$

$$\sigma_{max}^P = \frac{S_{xx}^0 + S_{yy}^0 - P_{cr}}{2} + \sqrt{\left(\frac{S_{xx}^0 - S_{yy}^0 + P_{cr}}{2}\right) + (T_{xy}^0)^2}, \quad (45)$$

$$\sigma_{min}^P = \frac{S_{xx}^0 + S_{yy}^0 - P_{cr}}{2} - \sqrt{\left(\frac{S_{xx}^0 - S_{yy}^0 + P_{cr}}{2}\right) + (T_{xy}^0)^2}. \quad (46)$$

View 1106 shows a third sub-step of the step 202f, which includes calculating the hoop stress around the perforation tunnel 138. Following the conditions satisfying the Eqs. 7 and 9, a plane strain condition along the perforation axis, $z_P$, can be assumed. Therefore the hoop stress with respect to the perforation tunnel 138 can be obtained as follows:

$$\sigma_\theta = (S_{xx}^0 + S_{yy}^0 - P_{cr}) - 2\cos 2\theta_P \sqrt{(S_{xx}^0 - S_{yy}^0 + P_{cr})^2 + 4T_{xy}^{0^2}} - (P_{perf} - P_0) \quad (47).$$

Eq. 47 adds the induced stress by $P_{cr}$. Since, in some aspects, the rock breakdown due to the fracturing fluid likely initiates at the perforation base along the direction of $\sigma_{max}^P$ with $\theta_P = 0$, this leads to the hoop stress as follows:

$$\sigma_\theta = (S_{xx}^0 + S_{yy}^0 - P_{cr}) - 2\sqrt{(S_{xx}^0 - S_{yy}^0 + P_{cr})^2 + 4(T_{xy}^0)^2} \quad (48).$$

The hydraulic fracture generally initiates when the hoop stress around the perforation tunnel 138 exceeds the rock tensile strength, T. Based on the stress sign convention, it follows:

$$(S_{xx}^0 + S_{yy}^0 - P_{cr}) - 2\sqrt{(S_{xx}^0 - S_{yy}^0 + P_{cr})^2 + 4(T_{xy}^0)^2} - (P_{perf} - P_0) = -T \quad (49),$$

$$\alpha = S_{xx}^0 + S_{yy}^0 \quad (50),$$

$$b = S_{xx}^0 - S_{yy}^0 \quad (51).$$

Eq. 49 can be simplified as:

$$\alpha + T + P_0 - (P_{cr} + P_{perf}) - 2\sqrt{(b + P_{cr})^2 + 4(T_{xy}^0)^2} = 0 \quad (52),$$

with:

$$c = \alpha + T + P_0 \quad (53),$$

$$P_{perf} = \beta_{perf} P_w \quad (54),$$

$$P_{cr} = \beta_{cr} P_w \quad (55).$$

In some implementations, using the deterministic model continues at step 202f, which includes determining a breakdown pressure for the subsurface formation based at least in part on the calculated one or more hoop stresses. In some aspects, step 202f includes solving a non-linear equation (by the computational framework) to determine the breakdown pressure. For example, based on the calculated hoop stresses, the breakdown pressure, $P_w$, of the subsurface formation 118 into which a cased, deviated wellbore (wellbore 104) is formed may be calculated according to:

$$(\beta_{perf}^2 + 2\beta_{cr}\beta_{perf} - 3\beta_{cr}^2)P_w^2 - (2c\beta_{cr} + 8b\beta_{cr} + 2c\beta_{perf})P_w + c^2 - 4b^2 - 16(T_{xy}^0)^2 = 0 \quad (56).$$

The result of this calculation of P should be a positive number. As shown, Eq. 56 is a quadratic equation and the breakdown pressure may not be given by an explicit expression (as is the case for conventional, vertical, open hole wellbores), namely, because of the casing-cement interaction and estimating the interface pressure, $P_{cr}$, with the computational framework of method 200.

The deterministic model described above with reference to step 202 of method 200 receives one or more parameters as input and produces a scalar estimate of breakdown pressure ($P_w$) as output. The breakdown pressures are determined based at least in part on the in-situ stresses in the perforation coordinate system. The breakdown pressures are determined based at least in part on hoop stresses at a perforation tunnel wall of the at least one perforation tunnel.

In some examples, the parameters include aspects related to in-situ stresses of the subsurface formation 118 and orientations of the in-situ stresses (for example, the maximum horizontal in-situ stress ($S_{Hmax}$) the minimum horizontal in-situ stress ($S_{Hmin}$), the orientation angle of the maximum or minimum horizontal in-situ stress, the vertical stress (for example, the $S_V$ (total stress) and/or the $\sigma_V$ (effective stress), etc.).

In some examples, the parameters include mechanical properties (for example, static and/or dynamic Young's modulus of the casing 122, the cement 130, and/or the subsurface formation 118, the static and/or dynamic Poisson's ratio of the casing 122, the cement 130, and/or the subsurface formation 118, etc.), fluid properties of the fracking liquid (for example, the fluid density ($\rho$), the perforation coefficient of discharge ($C_d$), the flow rate (Q), perforation fraction ($\beta_{perf}$), etc.) and mechanical failure criteria (for example, the tensile strength (T) of the subsurface formation 118).

In some examples, the parameters include geometric parameters (for example, the radius of the wellbore wall ($R_w$), the casing inside radius ($R_{is}$), the casing outside radius ($R_{oc}$), the initial perforation diameter (d), the number of perforation tunnels (N), the measured depth within the wellbore, etc.) and geometric orientations of the perforation tunnels 138 (for example, the phase angle about the $y_B$-axis and/or the phase angle about the $z_B$-axis for each of the perforation tunnels), and/or geometric orientations of the wellbore 104 (for example, the deviation angle $\alpha_D$ about the $y_G$-axis and/or the azimuth angle $\alpha_A$ about $z_G$-axis, etc.).

In some examples, the deterministic model is re-computed for perforation clusters 140 at different depths within the wellbore 104. In this scenario, the deterministic model is used to determine breakdown pressures along the measured depth (or trajectory) of the wellbore 104 and also perforation orientations. In some examples, the parameters and/or the stresses depend on the measured depth (or trajectory).

In some implementations, the systems and methods described in this disclosure account for uncertainties associated with any or all of these parameters. In some examples, uncertainties arise in hydraulic fracturing treatment from at least three aspects: stochastic orientations (for example, maximum stress angle, perforation orientation, etc.), stochastic mechanical properties and stochastic geometric parameters as described above.

Figure 12:
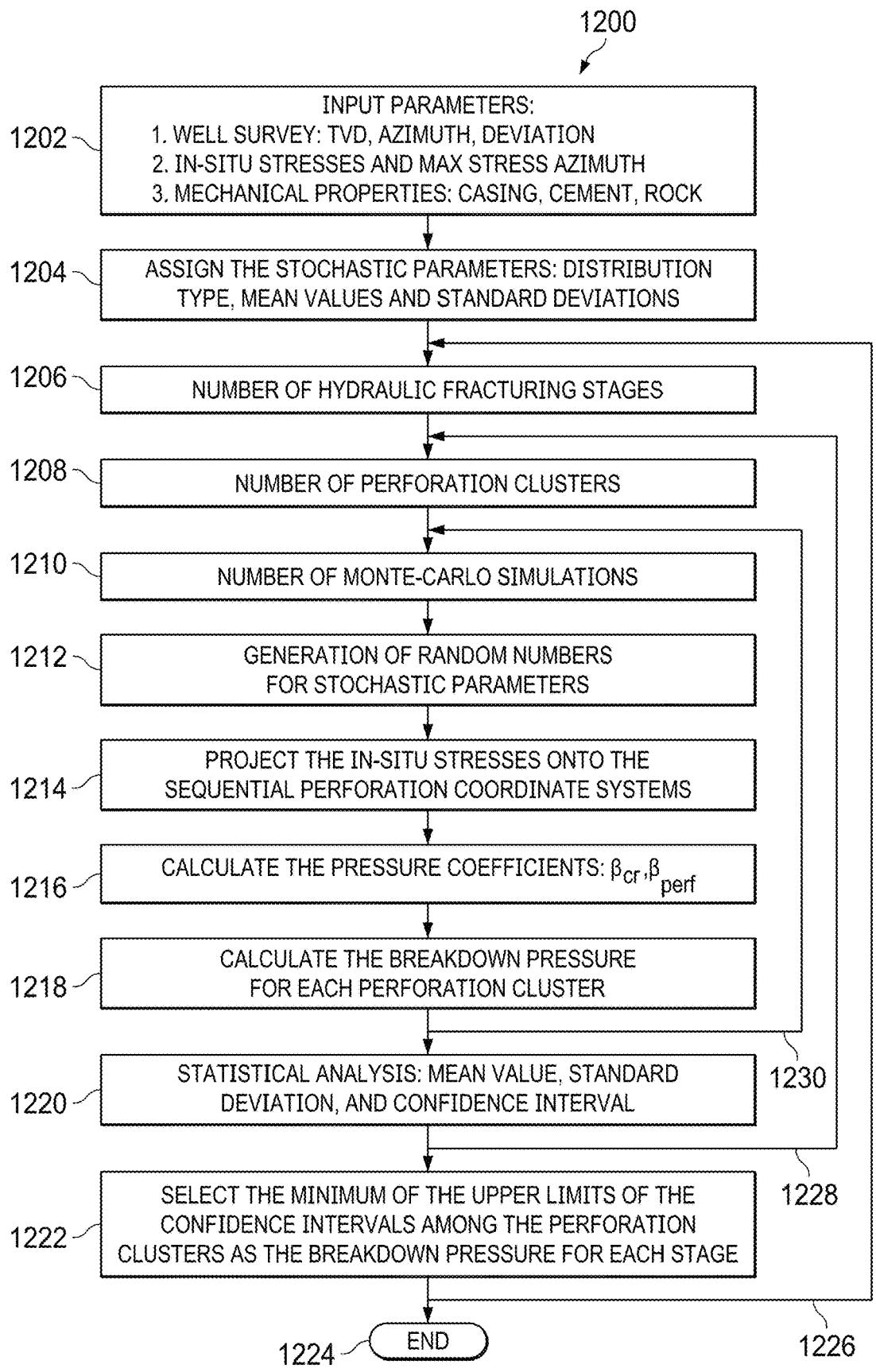
FIG. 12 is Monte Carlo simulation workflow for predicting the breakdown pressure of a deviated and cased hole with clustered perforations accounting for uncertainties.

FIG. 12 shows a Monte Carlo simulation workflow 1200 for predicting the breakdown pressure of a deviated and cased hole with clustered perforations while accounting for the above noted uncertainties. The workflow 1200 includes step 1202 which involves inputting parameters such as the well survey, total vertical depth (TVD), azimuth angles, and deviation angles. Parameters related to in-situ stress, maximum stress azimuth, and mechanical properties for the casing, cement, and rock are also input into the system executing the workflow 1200.

In some implementations, method 200 continues to step 204, as shown in FIG. 2B, which includes determining a different statistical distribution for each of one or more parameters of the deterministic model. For example, uncertainties of the respective parameters are accounted for using the statistical distribution of the respective parameters. Also referring to step 1204 shown in FIG. 12, the system and method determine a distribution type (for example, a normal distribution, a lognormal distribution, or a Gamma distribution) and parameters defining the statistical distribution (for example, mean and standard deviation). For example, in some cases, the statistical distribution is determined to be a normal distribution, a lognormal distribution, or a Gamma distribution.

Figure 13A:
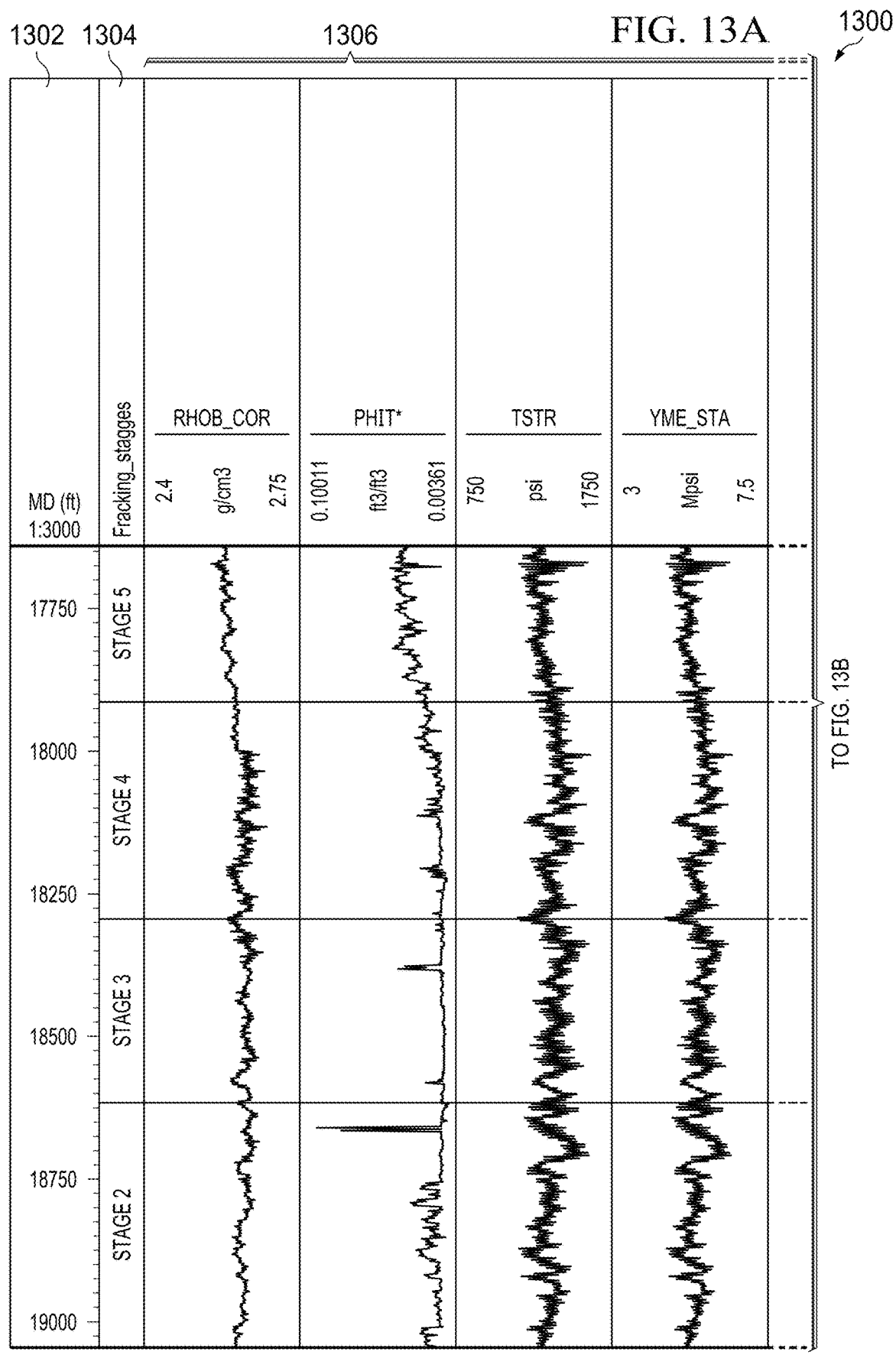
FIGS. 13A and 13B are a plot of log data from a 1D mechanical Earth model from a horizontal field well.
Figure 13B:
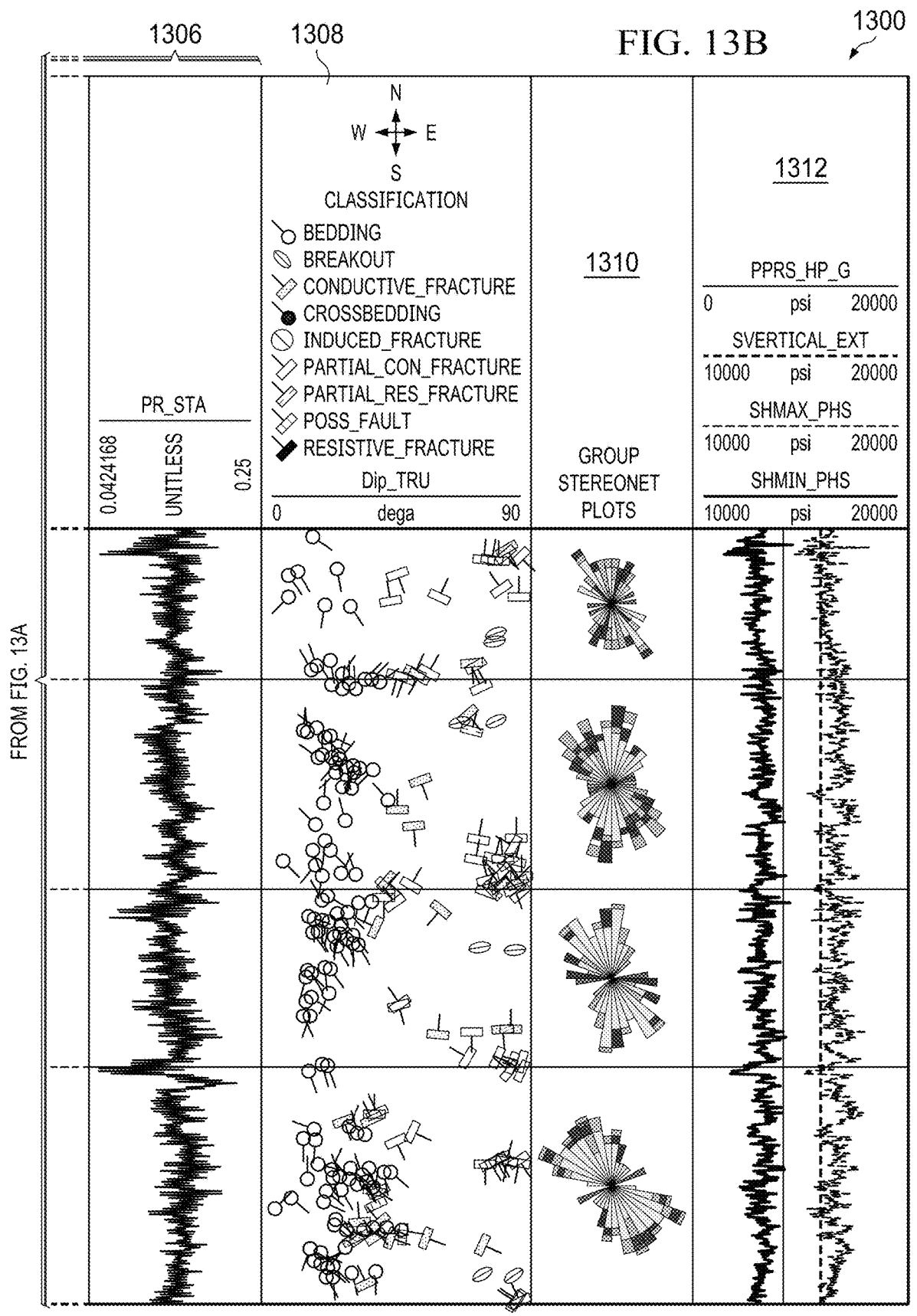

FIGS. 13A and 13B are a plot 1300 of log data from a 1D mechanical Earth model from a horizontal field well. The Earth model was calculated using a computer based on log data from a wellbore. Plot 1300 includes a measured depth (MD) column 1302 representing depth (in feet) measured from the surface of the wellbore. Plot 1300 includes a fracking stage column 1304 representing the fracking stage at a particular measured depth. In the example shown, the 1D mechanical Earth model includes five fracking stages. Each of these fracking stages includes a perforation cluster with one or more perforation tunnels.

Plot 1300 includes columns of measured log data of density ($\rho_{b\_cor}$) of the subsurface formation as "RHOB_COR," the rock porosity as "phit*," the tensile strength of the subsurface formation (I) as "TSTR," the static Young's modulus of the subsurface formation (E), as "YME_STE," and the static Poisson's ratio of the subsurface formation (v) as "PR_STA," respectively.

In some examples, the statistical distributions are represented as a function of a measured depth within the wellbore. For example, the measured data for each of these parameters depend on the measured depth (MD). For example, the static Poisson's ratio of the subsurface formation (v) varies between 0 and 0.28 along the measured depth for the range of measured depth shown (for example, between 17,500 and 19,000 feet).

Column 1308 represents the classification of the rock on a delta scale, column 1310 is a group stereonet plot of the rock, and column 1312 represents the in-situ stresses within the rock. For example, column 1312 represents the maximum horizontal in-situ stress ($S_{Hmax}$), the minimum horizontal in-situ stress ($S_{Hmin}$), the total vertical stress ($S_V$), and pore pressure ("PPRS_HP_G"). In the example shown, the stresses represented in column 1312 vary between 10,000 psi and 20,000 psi along the measured depth.

Figure 14A:
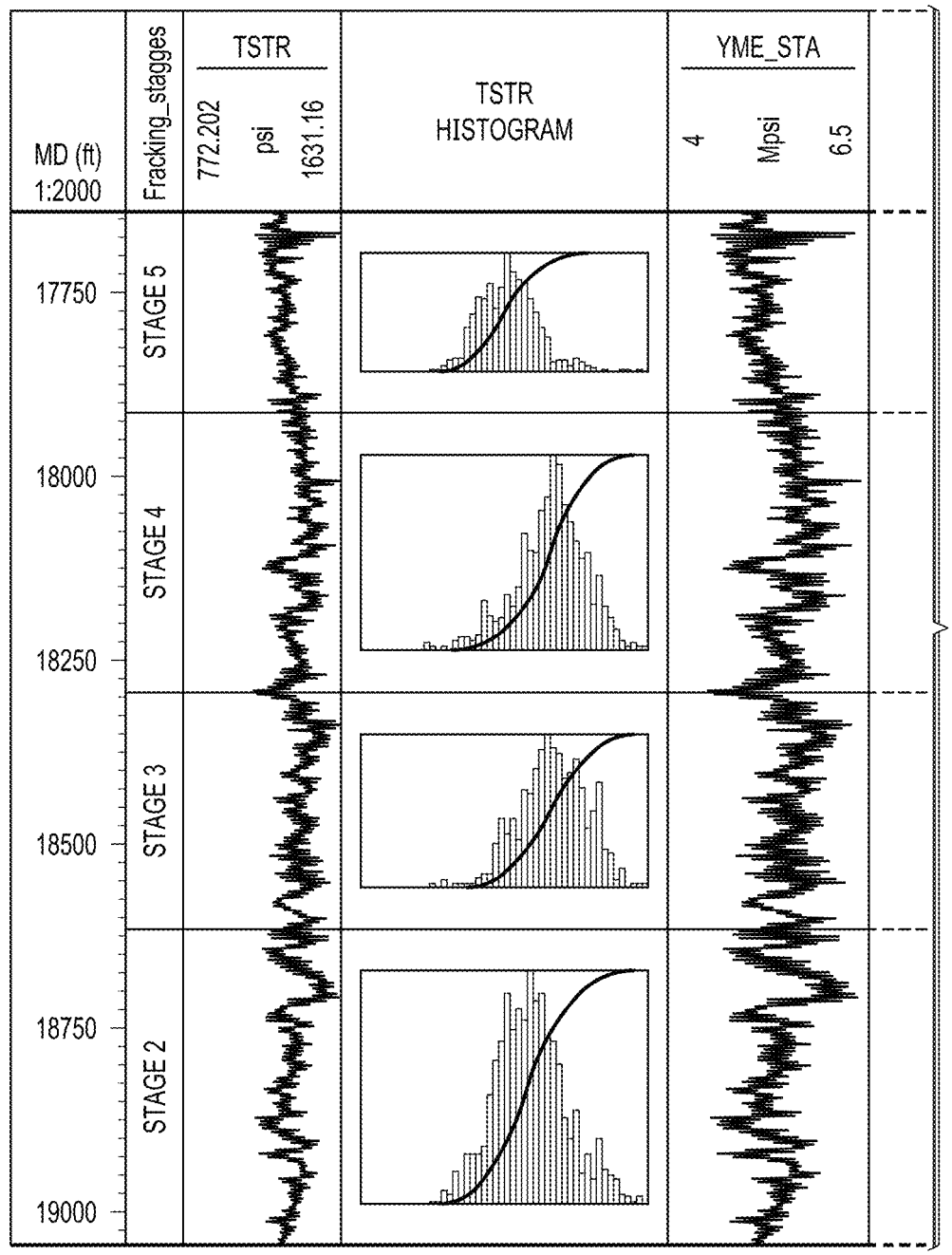
FIGS. 14A and 14B are a detailed plot of the log data shown in FIGS. 13A and 13B for tensile strength, Young's modulus and Poisson ratio.
Figure 14B:
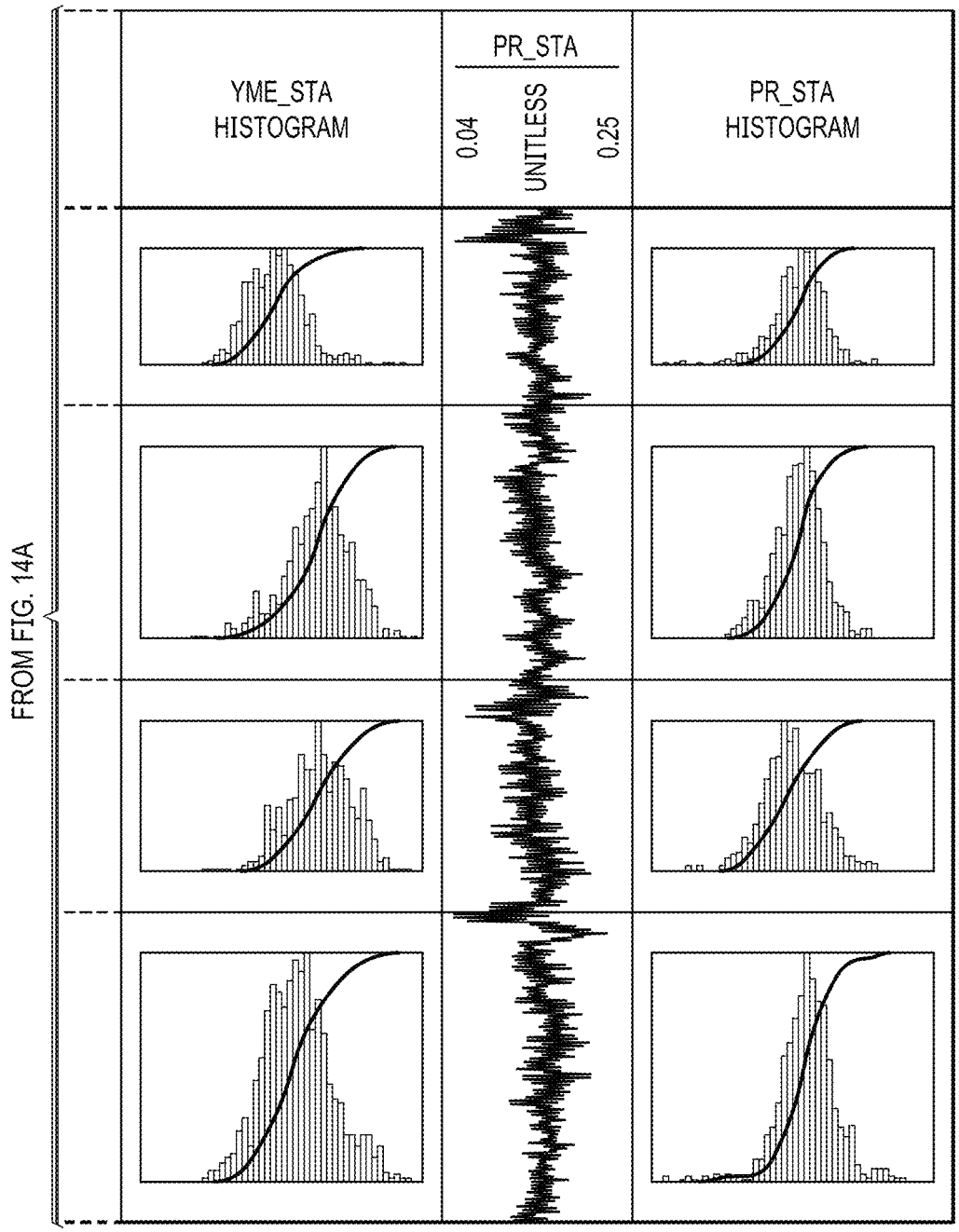

FIGS. 14A and 14B are a detailed plot 1400 of the log data shown in FIGS. 13A and 13B. FIGS. 14A and 13B show tensile strength of the subsurface formation (T), the static Young's modulus of the subsurface formation (E), and the static Poisson's ratio of the subsurface formation (v), respectively, along a horizontal plane of the well and the corresponding histograms for each fracking stage. The histogram is a graphical representation of a frequency distribution of the parameters and indicates how often a particular value of a parameter is measured using the log data. In the example shown, the histograms are shown for each fracking stage.

A histogram represents any distribution, but in general, the frequency distributions represent either a normal, lognormal, or gamma statistical distribution. The statistical distributions are based on log data from the well-bore. Based on the shapes of the histograms, formation tensile strength is considered a normal distribution as well as Young's modulus and Poisson ratio.

Figure 15A:
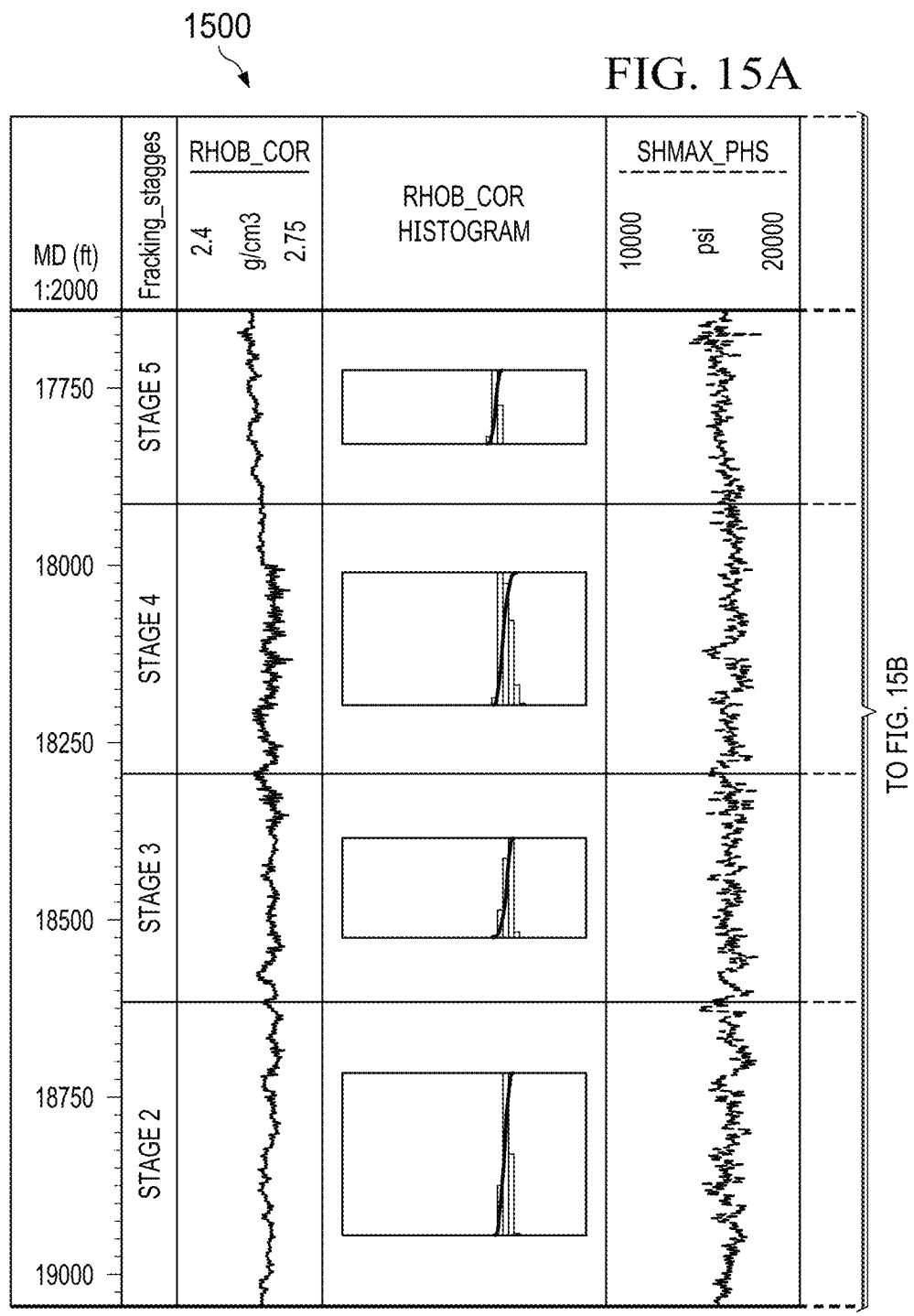
FIGS. 15A and 15B are a detailed plot of the log data shown in FIGS. 13A and 13B for density, maximum horizontal stress, and minimum horizontal stress.
Figure 15B:
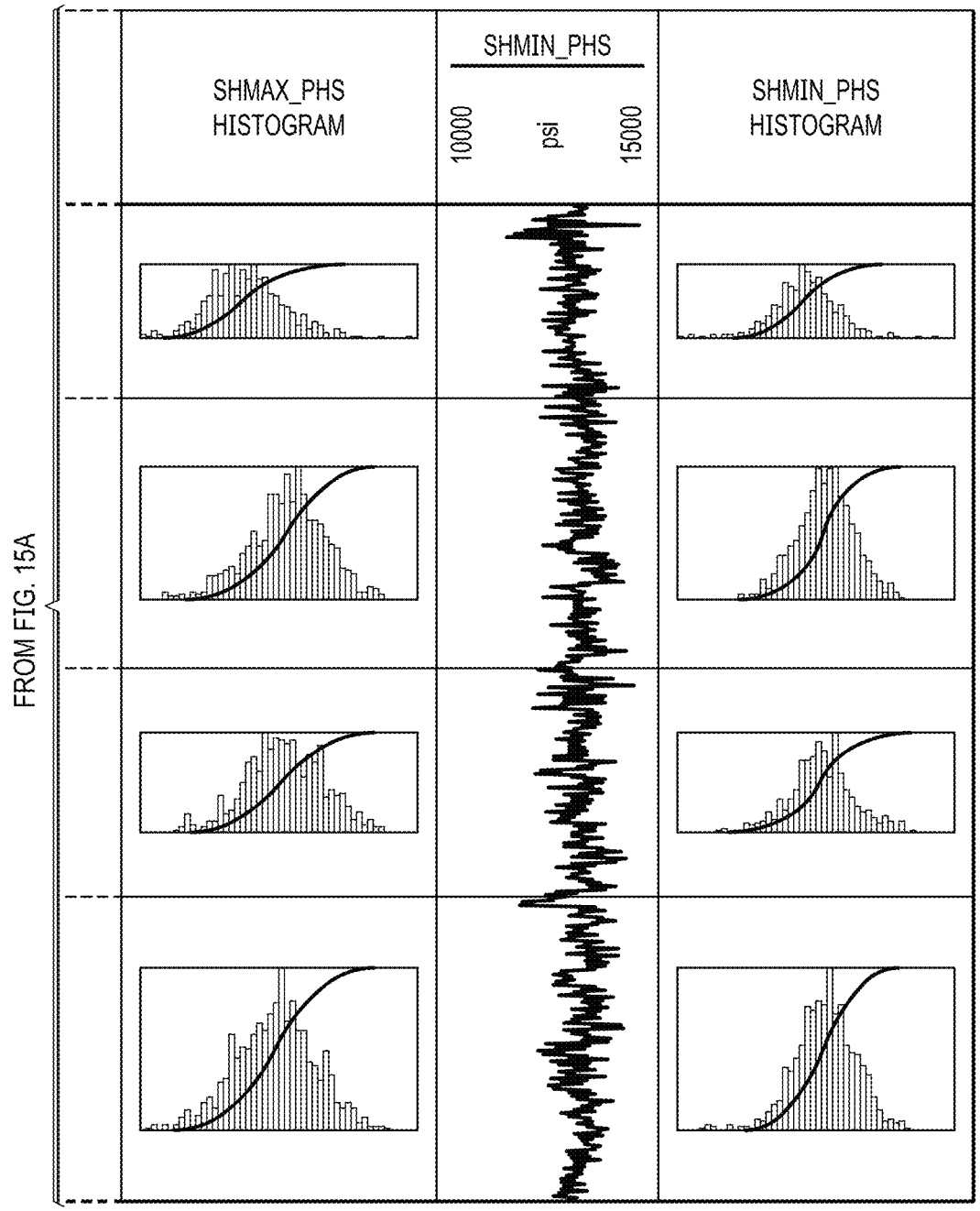

FIGS. 15A and 15B are a detailed plot 1500 of the log data shown in FIGS. 13A and 13B for density and maximum and minimum horizontal stresses. In petro-geomechanics, the density log is used to estimate the vertical stress and calculate the maximum and minimum horizontal stresses. For example the density log is used to estimate the vertical stress and calculate the maximum and minimum horizontal stresses according to Eqs. 2-5 above. The histogram results of the density log data represent about 3-5 different results compared to the histogram results of the stresses which represent more than 10 different results. In the example shown, the density log data does not show a clear statistical distribution for the horizontal well and is considered approximately constant (for example, the density log data shows a negligible variation as a function of depth). However, the histograms of maximum and minimum horizontal stresses represent normal distributions. In some examples, the density is considered a normal distribution since it is mathematically related to the maximum and minimum stresses. In examples where the statistical distribution is small, the parameter is considered constant. For example, the statistical distribution is "small" when the histogram shows the statistical distribution within a narrow interval (for example, less than 6 different results of the histogram).

In some implementations, the Monte Carlo simulation workflow 1200 continues to step 1206, which includes inputting the number of hydraulic fracturing stages of the well. The workflow 1200 continues to step 1208, which includes inputting the number of perforation clusters of the well. The workflow 1200 continues to step 1210, which includes inputting a number of Monte Carlo simulations. The deterministic model is solved for the total number of Monte Carlo simulations.

In some implementations, method 200 continues to step 206, which includes probabilistically solving the deterministic model to determine a mean and a standard deviation of breakdown pressures along the measured depth within the wellbore. In some examples, probabilistically solving, the deterministic model includes randomly accounting for uncertainties of the one or more parameters based on the determined statistical distributions for each of the one or more parameters.

In some implementations, probabilistically solving the deterministic model includes step 1212 of the Monte Carlo simulation workflow 1200, which includes generating random numbers for each of the one or more parameters (for example, the stochastic parameters). For example, the systems and methods described in this disclosure generate a random number based on the statistical distribution for each of the one or more parameters. In some examples, the random number is generated using a Box-Muller method. The Box-Muller method is a pseudo-random sampling method for generating pairs of independent Z(0,1) random numbers, given a source of U(0,1) random numbers, The Box-Muller Method transforms the random variable U=($U_1$, $U_2$) into another random variable, $$\begin{cases} Z_1 = (-2\ln U_1)^{1/2}\cos(2\pi U_2) \\ Z_2 = (-2\ln U_1)^{1/2}\sin(2\pi U_2) \end{cases}, \quad (56)$$

where $Z_1$, $Z_2$ are independent random values within an interval [0, 1]. For example, if the statistical distribution of the parameters are normal distributions defined by a mean value μ and a standard deviation δ, a random number of variable X~(μ,δ) is defined using a transformation as follows:

$$\begin{cases} X_1 = \mu + \delta Z_1 \\ X_2 = \mu + \delta Z_2 \end{cases}. \quad (57)$$

In other words, Eq. 57 is a function that randomly generates a pair of stochastic parameters $X_1$, $X_2$ based on the statistical distributions of each respective parameter of each parameter using a Box-Muller method. For example, the Box-Muller method according to Eq. 56 generates pairs of independent random numbers $Z_1$, $Z_2$ and $Z_1$, $Z_2$ are used as input to calculate the pair of random variables $X_1$, $X_2$. In examples where the statistical distribution is a normal distribution, Eq. 57 uses the mean and standard deviation of the normal distribution. In other examples where a different statistical distribution is used (for example, a lognormal or Gamma distribution) variables other than the mean and standard deviation are included in Eq. 57.

When $X_1$, $X_2$ are substituted into the deterministic breakdown pressure model for each of the one or more parameters, many Monte Carlo simulations (for example, hundreds or thousands of simulations) are performed for each fracturing stage and each perforation cluster of each fracturing stage. The results of the Monte Carlo simulations generate a probabilistic prediction of breakdown pressure for each perforation cluster of each fracturing stage. In other words, in some cases, performing the Monte Carlo statistical analysis involves at least one thousand different variations of the one or more parameters to the deterministic model for each perforation cluster of each fracturing stage.

Solving the deterministic model using $X_1$, $X_2$ involve step 1214, which includes projecting the in-situ stress onto the sequential perforation coordinate system (for example, perforation coordinate system 406 ($x_P$, $y_P$, $z_P$) described above with reference to FIG. 4A, Solving the deterministic model using $X_1$, $X_2$ involves step 1216, which includes calculating the pressure coefficients ($\beta_{perf}$, $\beta_{cr}$) according to Eqs. 32 and 40, respectively. Solving the deterministic model using $X_1$, $X_2$ involves step 1218, which includes calculating the breakdown pressure for each perforation cluster. In some examples, the probabilistic prediction of breakdown pressure includes a mean and a standard deviation of the breakdown pressures for each fracturing stage of the well. Steps 1210-1218 are repeated to calculate the breakdown pressure for each number of Monte Carlo simulations. This "looping" process is denoted in FIG. 12 using a return arrow 1230 from step 1218 to step 1210. For example, if the number of Monte Carlo simulations is 1,000, then steps 1210-1218 are repeated 1,000 times. In this example, the independent random values $Z_1$, $Z_2$ are updated within each loop 1230 according to Eq. 56 so that each determined breakdown pressure varies according to the uncertainness of the input parameters.

In some implementations, method 200 continues to step 208, which includes processing the mean and the standard deviation of breakdown pressures for each perforation cluster of each fracturing stage to determine an upper bound breakdown pressure based on a confidence level. The Monte Carlo simulation workflow 1200 continues to step 1220, which includes performing a statistical analysis of the breakdown pressures for each perforation cluster of each fracturing stage. Steps 1208-1220 are repeated to calculate the breakdown pressure for each perforation cluster of the fracking stage. For example, this "looping" process is denoted in FIG. 12 using a return arrow 1228 from step 1220 to step 1208, which indicates that the number of Monte Carlo simulations of step 1210 are repeated for each perforation cluster. For example, if the number of perforation clusters is 3 and the number of Monte Carlo simulations is 1,000, then steps 1208-1220 are repeated 3,000 times (3×1,000). In this example, the input parameters for each perforation cluster are updated within each loop 1228 and the independent random values $Z_1$, $Z_2$ are updated within each loop 1230 according to Eq. 56.

The Monte Carlo simulation workflow 1200 continues to step 1222, which includes determining a minimum of the upper limits of the confidence intervals for the perforations cluster of each fracturing stage as the breakdown pressure for each fracturing stage. Steps 1206-1222 are repeated to calculate the breakdown pressure for each fracking stage of the deviated well. For example, this "looping" process is denoted in FIG. 12 using a return arrow 1226 from step 1220 to step 1206, which indicates that the number of Monte Carlo simulations of step 1210 are repeated for each perforation cluster and each finking stage. For example, if the number of fracking stages is 5, the perforation clusters is 3, and the number of Monte Carlo simulations is 1,000, then steps 1206-1222 are repeated 15,000 times (5×3×1,000). In this example, the input parameters for each fracking stage are updated within each loop 1226, the input parameters for each perforation cluster are updated within each loop 1228, and the independent random values $Z_1$, $Z_2$ are updated within each loop 1230 according to Eq. 56.

In some examples, processing the mean and the standard deviation of breakdown pressures comprises generating a histogram of the breakdown pressures. In some examples, the confidence level is a 95% confidence level. For example, a 95% confidence level for an unknown breakdown pressure means that there is a 95% probability that the confidence interval will contain the true breakdown pressure. The mean value $\mu$ and standard deviation $\delta$ of the breakdown pressure for a perforation cluster is determined and based on the results of the Monte Carlo simulations. In some examples, the confidence interval of the breakdown pressure is calculated by:

$$95\% \text{ Confidence interval} = \mu \pm 1.96 * \delta \quad (58).$$

The confidence interval of the breakdown pressure is ($\mu$−1.96*$\delta$, $\beta$+1.96*$\delta$). A pump schedule is determined based on the determined confidence interval. For example, a pump schedule is determined to generate a downhole pressure above the upper bound breakdown pressure (for example, above $\mu$+1.96*$\delta$) to increase a likelihood of a successful breakdown of the subsurface formation and to increase the likelihood of a successful fracking operation. In other words, the method includes determining the pump schedule of an injection pump based at least in part on the determined upper bound breakdown pressure.

Once the upper bound breakdown pressure is determined for each fracturing stage, the Monte Carlo simulation workflow 1200 continues to step 1224 to conclude the probabilistic simulation. In some examples, the calculated upper bound breakdown pressure is presented (for example, via a display of the control system 146) to an operator, such as a hydraulic fracturing operator, in order to design a hydraulic fracturing operation.

In some implementations, method 200 continues to step 210, which includes drilling and completing a deviated well with a wellhead selected at least in part based on the determined upper bound breakdown pressure. In some implementations, method 200 continues to step 212, which includes injecting hydraulic fluid into the deviated well at an injection pressure determined at least in part on the determined upper bound breakdown pressure to cause hydraulic fracturing of the subsurface formation. In some examples, injecting the hydraulic fluid into the deviated well is performed by the injection pump using the determined pump schedule.

FIGS. 16-23 are results from a horizontal well case study to demonstrate the probabilistic model performance and how to apply the method in engineering practice.

Table 1 shows example output data from the computational framework of method 200 for an example cased, deviated wellbore with perforation clusters. Table 1 includes columns for the well trajectory, inner diameter (ID) and outer diameter (OD) of casing and cement, and the mechanical properties (such as Young's modulus (YM) and Poisson's ratio (PR)) of the casing, the cement, and the formation (all as a function of measured depth (MD)). The results of Table 1 are nominal values used in the deterministic model.

TABLE 1

Well trajectory, ID and OD of casing-cement, and mechanical properties.

| MD ft | Azimuth degree | Deviation in | Casing ID in | Casing OD in | Cement ID in | Cement OD in | Borehole ID in | Casing YM psi | Casing PR | Cement YM psi | Cement PR | Rock YM psi | Rock PR |
|---|---|---|---|---|---|---|---|---|---|---|---|---|---|
| 10000 | 0 | 85 | 4.09 | 4.5 | 4.5 | 5.875 | 5.875 | 29000000 | 0.2 | 250000 | 0.2 | 3000000 | 0.22 |
| 10500 | 1 | 86 | 4.09 | 4.5 | 4.5 | 5.875 | 5.875 | 29000000 | 0.2 | 250000 | 0.2 | 3000000 | 0.22 |
| 11000 | 2 | 87 | 4.09 | 4.5 | 4.5 | 5.875 | 5.875 | 29000000 | 0.2 | 250000 | 0.2 | 3000000 | 0.22 |
| 11500 | 3 | 88 | 4.09 | 4.5 | 4.5 | 5.875 | 5.875 | 29000000 | 0.2 | 250000 | 0.2 | 3000000 | 0.22 |
| 12000 | 4 | 89 | 4.09 | 4.5 | 4.5 | 5.875 | 5.875 | 29000000 | 0.2 | 250000 | 0.2 | 3000000 | 0.22 |
| 12500 | 5 | 90 | 4.09 | 4.5 | 4.5 | 5.875 | 5.875 | 29000000 | 0.2 | 250000 | 0.2 | 3000000 | 0.22 |
| 13000 | 6 | 91 | 4.09 | 4.5 | 4.5 | 5.875 | 5.875 | 29000000 | 0.2 | 250000 | 0.2 | 3000000 | 0.22 |
| 13500 | 7 | 92 | 4.09 | 4.5 | 4.5 | 5.875 | 5.875 | 29000000 | 0.2 | 250000 | 0.2 | 3000000 | 0.22 |
| 14000 | 8 | 93 | 4.09 | 4.5 | 4.5 | 5.875 | 5.875 | 29000000 | 0.2 | 250000 | 0.2 | 3000000 | 0.22 |
| 14500 | 9 | 94 | 4.09 | 4.5 | 4.5 | 5.875 | 5.875 | 29000000 | 0.2 | 250000 | 0.2 | 3000000 | 0.22 |
| 15000 | 10 | 95 | 4.09 | 4.5 | 4.5 | 5.875 | 5.875 | 29000000 | 0.2 | 250000 | 0.2 | 3000000 | 0.22 |

Table 2 lists the predicted results of breakdown pressure corresponding to four cases, which represent one deterministic method and three probabilistic Monte Carlo simulations.

TABLE 2

Predicted breakdown pressure for deterministic method and Monte Carlo simulation. Note: AZ is the azimuth of the maximum horizontal stress (for example, the maximum horizontal stress angle).

| | Deterministic method | | | | | | Monte Carlo Simulation | | | | | |
|---|---|---|---|---|---|---|---|---|---|---|---|---|
| | | | | | | | Case I | | Case II | | Case III | |
| MD ft | Sv psi | Shmin psi | Shmax psi | AZ dega | PP psi | Pw psi | Mean value psi | Standard deviation psi | Mean value psi | Standard deviation psi | Mean value psi | Standard deviation psi |
| 10000 | 10500 | 2961.5 | 3701.9 | 90 | 5000 | 6623.3 | 6652.4 | 63.3 | 6624.4 | 215.2 | 6653.7 | 225.4 |
| 10500 | 10500 | 2961.5 | 3701.9 | 90 | 5000 | 6626.5 | 6665.6 | 68.2 | 6627.7 | 215.3 | 6667.2 | 227.2 |
| 11000 | 10500 | 2961.5 | 3701.9 | 90 | 5000 | 6631.8 | 6678.8 | 74.9 | 6633.0 | 215.4 | 6680.5 | 229.6 |
| 11500 | 10500 | 2961.5 | 3701.9 | 90 | 5000 | 6639.2 | 6692.2 | 83.6 | 6640.3 | 215.5 | 6694.1 | 232.8 |
| 12000 | 10500 | 2961.5 | 3701.9 | 90 | 5000 | 6648.5 | 6705.9 | 93.9 | 6649.6 | 215.5 | 6707.9 | 236.9 |
| 12500 | 10500 | 2961.5 | 3701.9 | 90 | 5000 | 6659.8 | 6720.1 | 105.7 | 6660.9 | 215.5 | 6722.4 | 242.0 |
| 13000 | 10500 | 2961.5 | 3701.9 | 90 | 5000 | 6661.9 | 6719.4 | 108.8 | 6663.1 | 215.5 | 6721.9 | 243.4 |
| 13500 | 10500 | 2961.5 | 3701.9 | 90 | 5000 | 6662.4 | 6717.8 | 112.2 | 6663.5 | 215.5 | 6720.6 | 244.9 |
| 14000 | 10500 | 2961.5 | 3701.9 | 90 | 5000 | 6661.0 | 6715.1 | 115.8 | 6662.2 | 215.4 | 6718.2 | 246.5 |
| 14500 | 10500 | 2961.5 | 3701.9 | 90 | 5000 | 6658.0 | 6711.3 | 119.6 | 6659.2 | 215.3 | 6714.7 | 248.2 |
| 15000 | 10500 | 2961.5 | 3701.9 | 90 | 5000 | 6653.3 | 6706.2 | 123.3 | 6654.5 | 215.2 | 6709.7 | 249.9 |

The deterministic method predicts the breakdown pressure based on constant model parameters. The probabilistic Monte Carlo simulation includes three cases. The first Monte Carlo simulation case (I) considers stochastic properties (for example, the random numbers using the Box-Muller method) of maximum stress angle only. The second Monte Carlo simulation (II) case considers stochastic properties of the rock tensile strength (TSTR) only. The third Monte Carlo simulation (III) considers stochastic properties of both rock tensile strength and maximum horizontal stress angle.

For this example, it is assumed that the mean value of the maximum horizontal stress angle is 90° and the standard deviation of the maximum horizontal stress angle is 9.0°. It is also assumed that the mean value of the tensile strength is 1000 psi and the standard deviation of the tensile strength is 200.0 psi. For example, the mean values and the standard deviation are computed using the log data in software. Perforation factor is also assumed to be $\beta_{perf}=0.95$ and factor $\beta_{cr}$ is calculated based on the parameters provided in Table 1.

As described above for the deterministic model, the predicted breakdown pressure is constant for each perforation cluster. However, for the probabilistic Monte Carlo simulation, the number of predicted breakdown pressures at each perforation cluster is equal to number of Monte Carlo simulations. The mean value and standard deviation of all Monte Carlo simulation are also calculated. For the current example, the calculated mean value and standard deviation results for all Monte Carlo simulations are shown in Table 2.

FIGS. 16-23 represent results for the perforation clusters at a measurement depth of 10,000 feet for this example. However, the results at the other measurement depths are similar.

Figure 16:
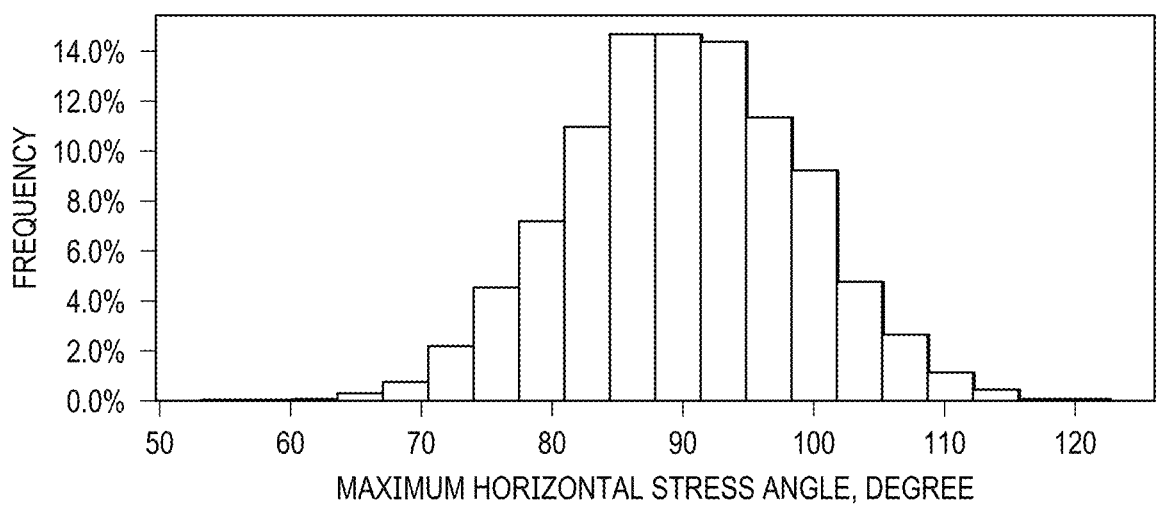
FIG. 16 is a histogram of random numbers representing the maximum horizontal stress angle (in degrees) and the frequencies of occurrence for each stress angle of Monte Carlo simulation case I.

FIG. 16 is a histogram 1600 of random numbers representing the maximum horizontal stress angle (in degrees) and the frequencies of occurrence for each stress angle of Monte Carlo simulation case I. In this example, the statistical distribution of the maximum horizontal stress angle parameter is a normal distribution with a mean and a standard deviation.

The random numbers are generated based on the Box-Muller method (Eqs. 56 and 57). Each random number of maximum horizontal stress angle along with other constant parameters are substituted into the deterministic breakdown pressure model to determine a predicted breakdown pressure. In other words, histogram 1600 represents random uncertainties of the maximum horizontal stress angle (in degrees) that is expected within the wellbore.

Figure 17:
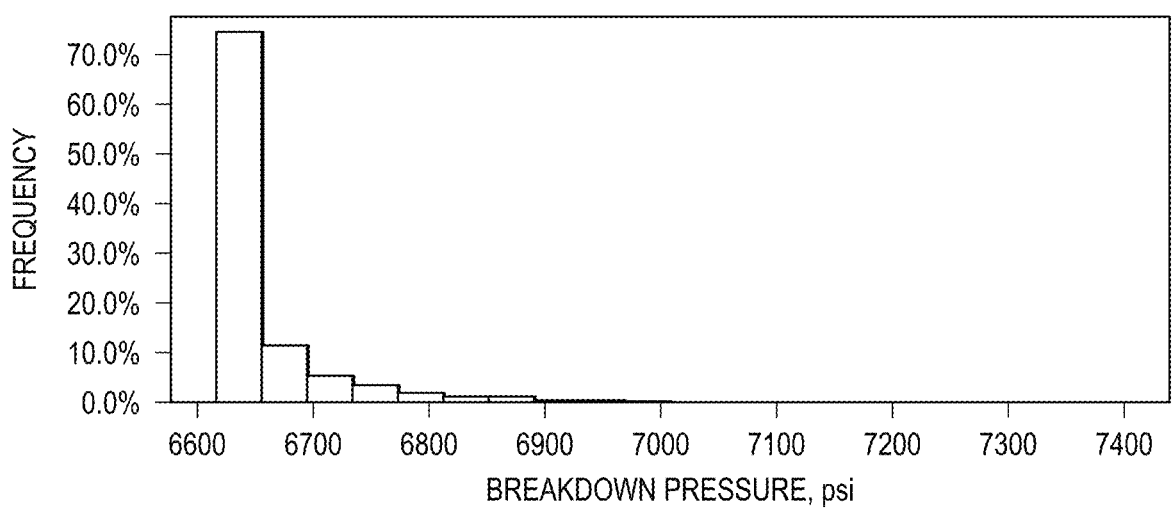
FIG. 17 is a histogram of the predicted breakdown pressure and frequencies based on 5,000 Monte Carlo simulations for Monte Carlo simulation case I.

FIG. 17 is a histogram 1700 of the predicted breakdown pressure and frequencies based on 5,000 Monte Carlo simulations for Monte Carlo simulation case I. The histogram 1700 indicates that a majority of the predicted breakdown pressure is between 6,600 psi and 6,700 psi. In other words, histogram 1700 represents uncertainties of the breakdown pressure that is expected within the wellbore based on uncertainties of the maximum horizontal stress angle.

One explanation of this result is that fracture initiation along the maximum horizontal stress direction and breakdown pressure is a minimum for this stress regime and well orientation. Other perforation directions should result in a higher breakdown pressure prediction. In some examples, this is why a normal distribution of maximum horizontal stress angle leads to a histogram resembling histogram 1700 as shown in FIG. 17.

Figure 18:
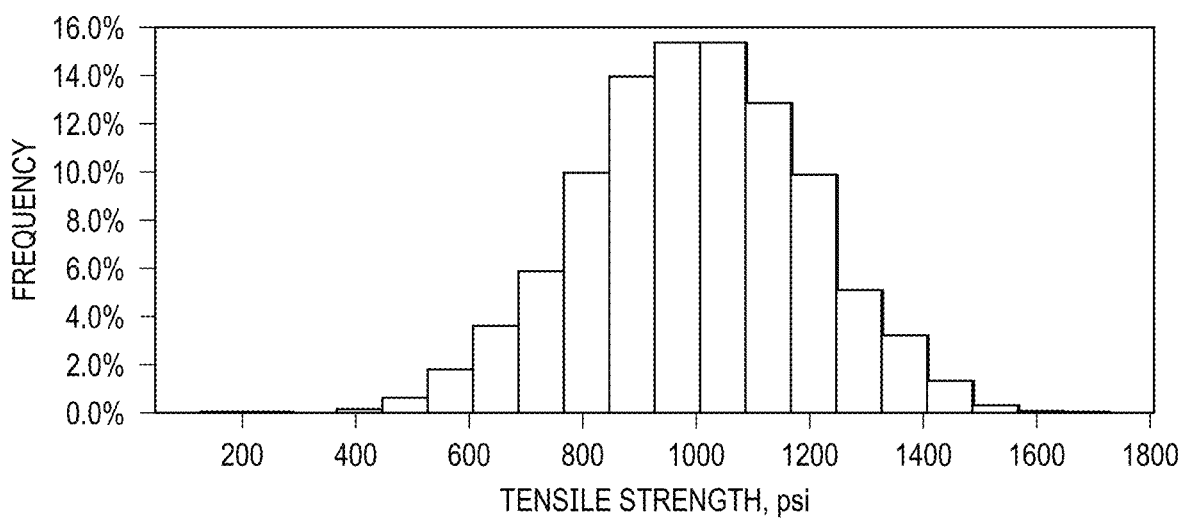
FIG. 18 is a histogram of random numbers representing the tensile strength of the subsurface formation (in psi) and the frequencies of occurrence for each tensile strength for Monte Carlo simulation case II.

FIG. 18 is a histogram 1800 of random numbers representing the tensile strength of the subsurface formation (in psi) and the frequencies of occurrence for each tensile strength for Monte Carlo simulation case II. In this example, the statistical distribution of the tensile strength parameter is a normal distribution with a mean and a standard deviation.

The random numbers are generated based on the Box-Muller method (Eqs. 56 and 57). Each random number of tensile strength along with other constant parameters are substituted into the deterministic breakdown pressure model to determine a predicted breakdown pressure. In other words, histogram 1800 represents random uncertainties of the tensile strength (in psi) that is expected within the wellbore.

Figure 19:
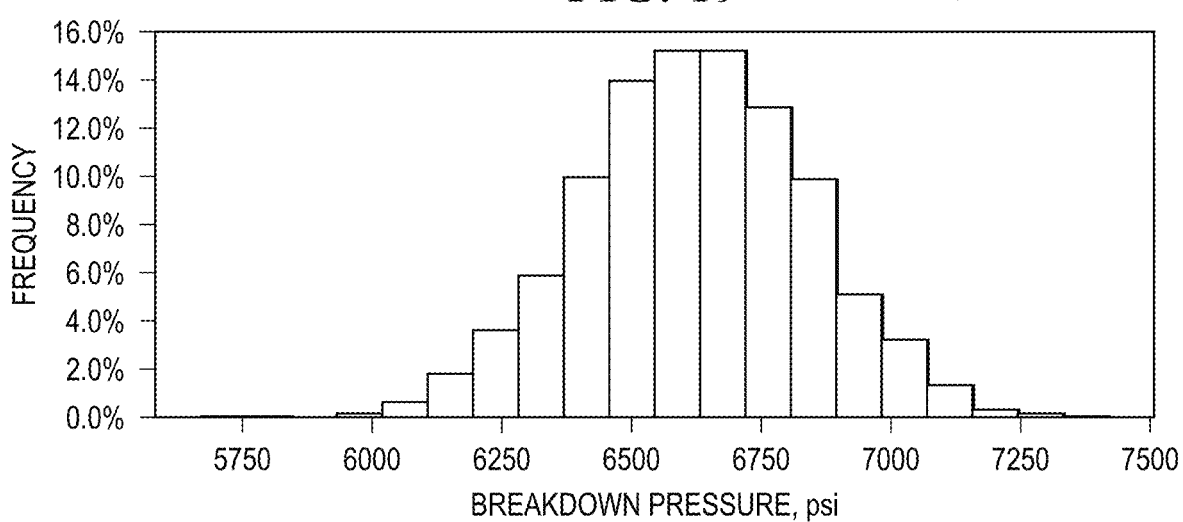
FIG. 19 is a histogram of the predicted breakdown pressure and frequencies based on 5,000 Monte Carlo simulations for Monte Carlo simulation case II.

FIG. 19 is a histogram 1900 of the predicted breakdown pressure and frequencies based on 5,000 Monte Carlo simulations for Monte Carlo simulation case II. The histogram 1900 indicates that a majority of the predicted breakdown pressure is between 6,500 psi and 6,750 psi. In other words, histogram 1900 represents uncertainties of the breakdown pressure that is expected within the wellbore based on uncertainties of tensile strength. The histogram 1900 resembles a normal distribution with a mean and a standard deviation.

Figure 20:
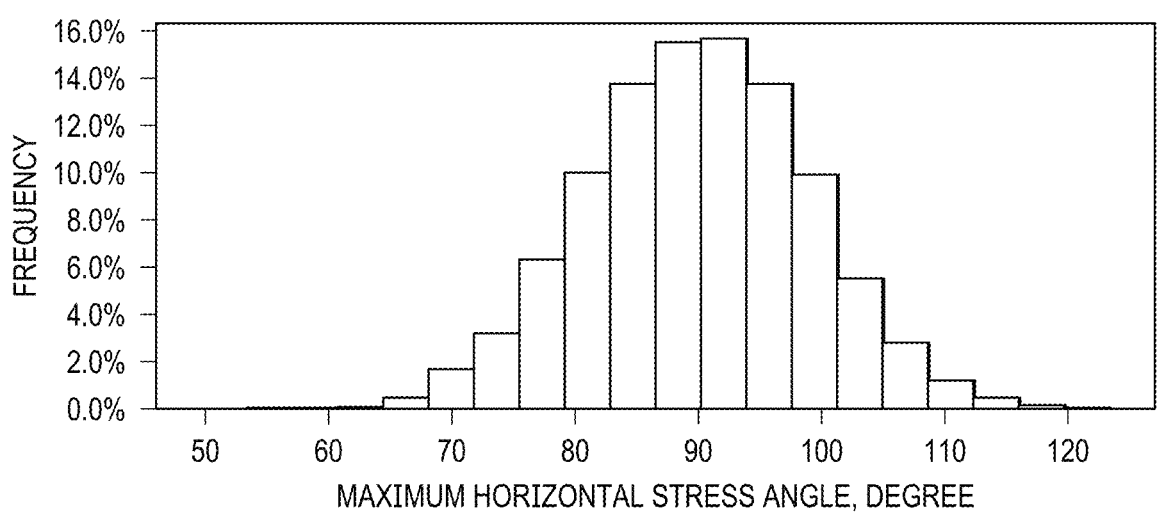
FIG. 20 is a histogram of random numbers representing the maximum horizontal stress angle (in degrees) and the frequencies of occurrence for each stress angle of Monte Carlo simulation case III.

FIG. 20 is a histogram 2000 of random numbers representing the maximum horizontal stress angle (in degrees) and the frequencies of occurrence for each stress angle of Monte Carlo simulation case III. In this example, the statistical distribution of the maximum horizontal stress angle parameter is a normal distribution with a mean and a standard deviation and is the same as FIG. 16.

Figure 21:
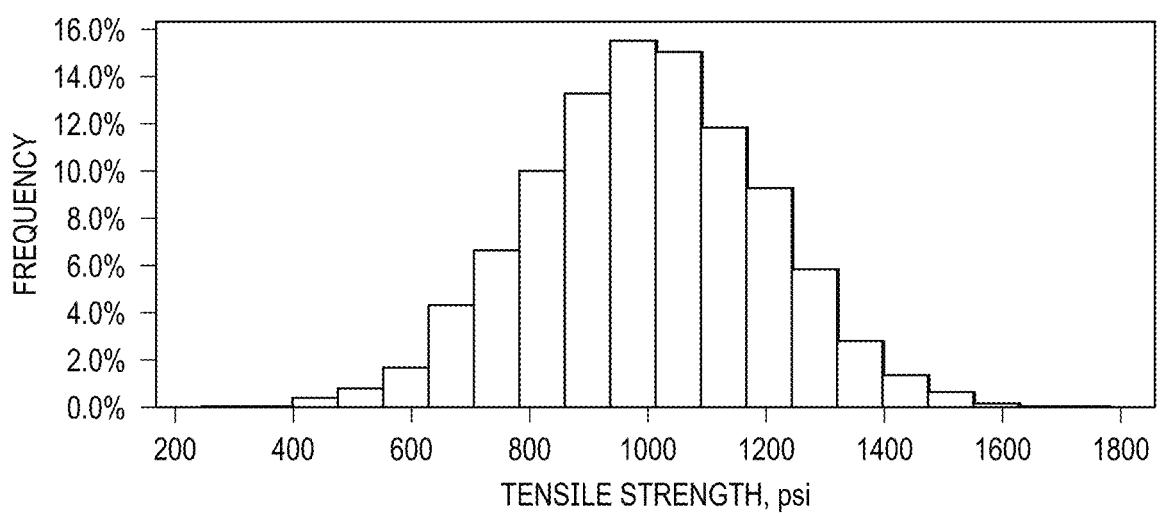
FIG. 21 is a histogram of random numbers representing the tensile strength of the subsurface formation (in psi) and the frequencies of occurrence for each tensile strength for Monte Carlo simulation case III.

FIG. 21 is a histogram 2100 of random numbers representing the tensile strength of the subsurface formation (in psi) and the frequencies of occurrence for each tensile strength for Monte Carlo simulation case III. In this example, the statistical distribution of the tensile strength parameter is a normal distribution with a mean and a standard deviation and different than FIG. 18.

Monte Carlo simulation case III consider both maximum horizontal stress angle uncertainties and tensile strength uncertainties simultaneously. The random numbers are generated based on the Box-Muller method (Eqs. 56 and 57). Each random number of maximum horizontal stress angle and each random number of tensile strength along with other constant parameters are substituted into the deterministic breakdown pressure model to determine a predicted breakdown pressure. In other words, histograms 2000 and 2100 represent random uncertainties of the maximum horizontal stress angle (in degrees) and the tensile strength (in psi) that is expected within the wellbore, respectively.

Figure 22:
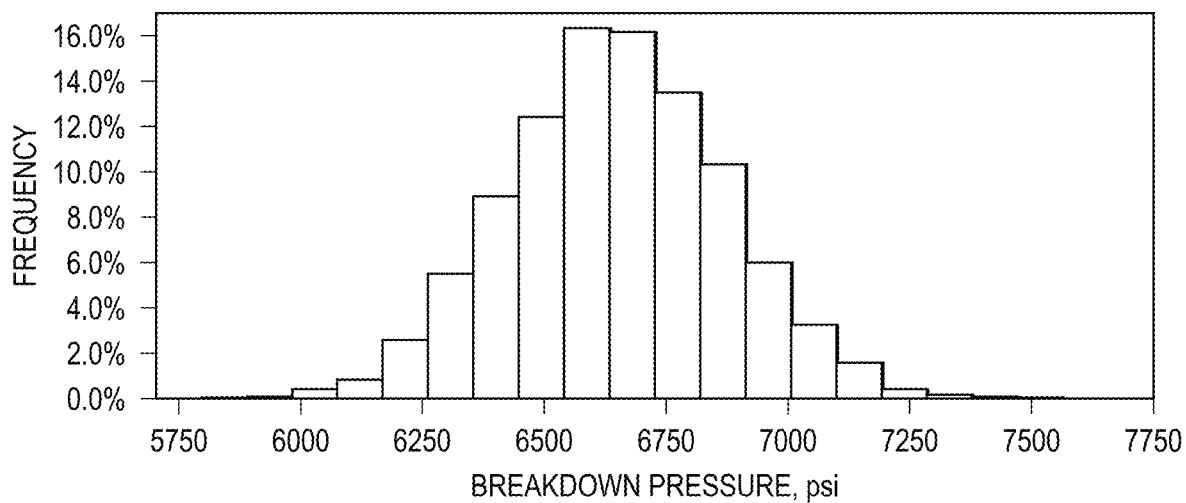
FIG. 22 is a histogram of the predicted breakdown pressure and frequencies based on 10,000 Monte Carlo simulations for Monte Carlo simulation case III.

FIG. 22 is a histogram 2200 of the predicted breakdown pressure and frequencies based on 10,000 Monte Carlo simulations for Monte Carlo simulation case III. The histogram 2200 indicates that a majority of the predicted breakdown pressure is between 6,500 psi and 6,750 psi. In other words, histogram 2200 represents uncertainties of the breakdown pressure that is expected within the wellbore based on uncertainties of both maximum horizontal stress angle and tensile strength. The histogram 2200 resembles a normal distribution with a mean and a standard deviation.

Figure 23:
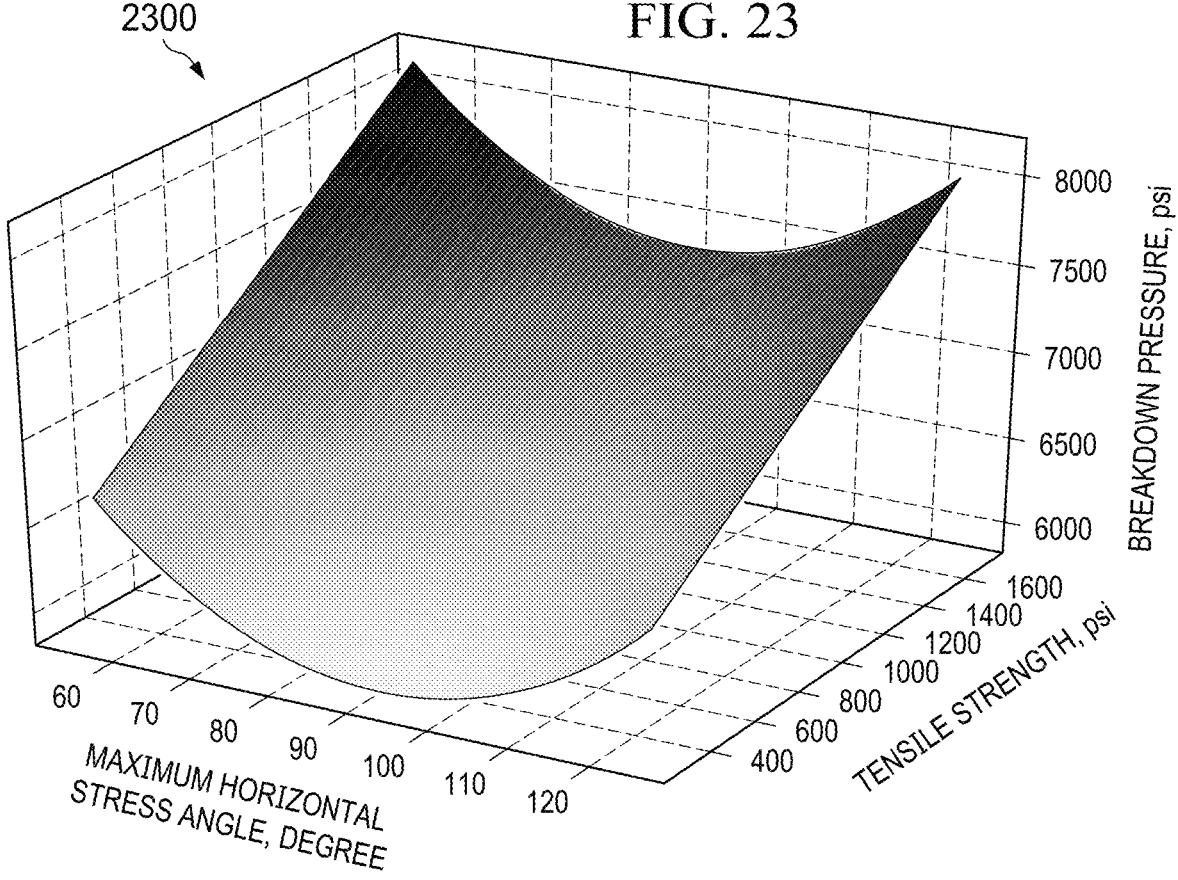
FIG. 23 is a surface plot of a 3D response surface considering the two stochastic parameters of maximum horizontal stress angle and tensile strength for Monte Carlo simulation case III.

FIG. 23 is a surface plot 2300 of a 3D response surface considering the two stochastic parameters of maximum horizontal stress angle and tensile strength for Monte Carlo simulation case III. The surface plot 2300 indicates that the maximum horizontal stress angle at 90° results in a minimum breakdown pressure for hydraulic fracture initiation (for example, the minimum breakdown pressure is about 6,000 psi). In the example shown, breakdown pressure increases linearly with increasing tensile strength. For example, if the maximum horizontal stress angle is 60° and the tensile strength is 1,600 psi, the resulting breakdown pressure would be about 7,500 psi. In other words, the breakdown pressure strongly depends (for example, in this case the dependence produces a 25% difference in breakdown pressure) on the maximum horizontal stress angle and the tensile strength of the subsurface formation as a result of expected uncertainties of these parameters within the wellbore.

The confidence interval of the breakdown pressure is determined with a specified level of confidence. In some examples, a 95% confidence interval is generated based on the Monte Carlo simulations. For example, the confidence interval of the breakdown pressure is determined at a specific depth in the wellbore (for example, at a measured depth of 10,000 feet).

The mean value and standard deviation for the Monte Carlo simulation case III are listed in Table 2, which are 6653.7 psi and 225.4 psi, respectively. For this example, the confidence interval for breakdown pressure is calculated by:

$$95\% \text{ Confidence interval}=6653.7\pm1.96*225.4 \qquad (59).$$

In this example, the confidence interval of the breakdown pressure is (6437.3 psi, 7095.5 psi). A pump schedule is determined based on this confidence interval. For example, the pump schedule is determined to deliver a downhole pressure above the upper bound breakdown pressure of 7095.5 psi for this perforation cluster. In practice, if there were more than one perforation cluster, this example would be repeated to determine a different breakdown pressure prediction for that perforation cluster. In this way, each perforation cluster results in one breakdown pressure prediction since each perforation tunnel of each respective perforation cluster are connected to a single pump schedule.

While the above example considered uncertainties of two input parameters at once, other examples account of uncertainties of more than two input parameters (for example, 3-10 input parameters). Visualization of the results for more than two input parameters is performed in software by plotting different combinations of input parameters to generate different response surfaces.

Figure 24:
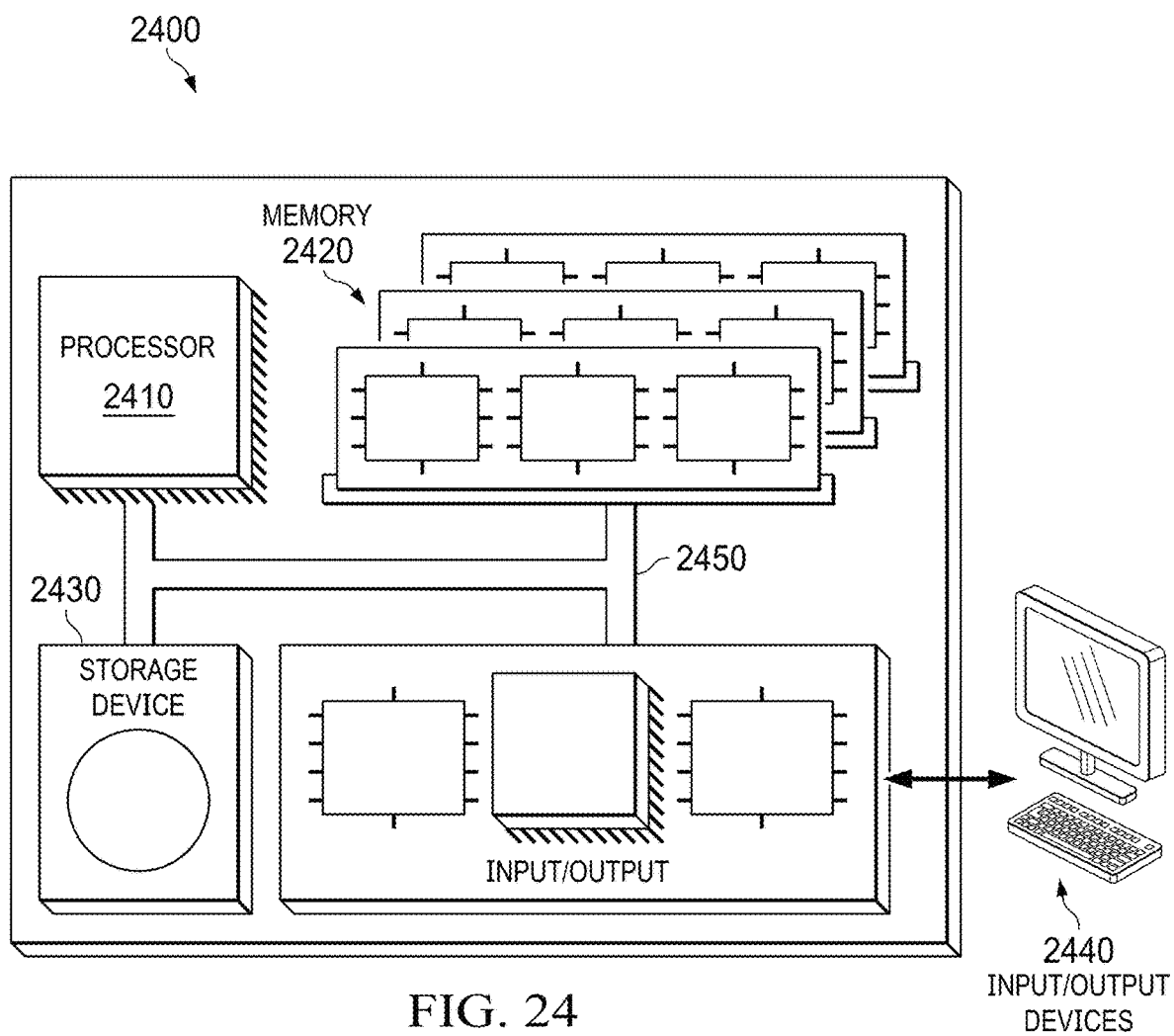
FIG. 24 is a schematic illustration of an example controller (or control system) for determining a subsurface formation breakdown pressure according to the present disclosure.

FIG. 24 is a schematic illustration of an example controller 2400 (or control system) for determining a subsurface formation breakdown pressure according to the present disclosure. For example, the controller 2400 may include or be part of the control system 146 shown in FIG. 1. The controller 2400 is intended to include various forms of digital computers, such as printed circuit boards (PCB), processors, digital circuitry, or otherwise parts of a system for determining a subsurface formation breakdown pressure. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 2400 includes a processor 2410, a memory 2420, a storage device 2430, and an input/output device 2440 (for displays, input devices, example, sensors, valves, pumps). Each of the components 2410, 2420, 2430, and 2440 are interconnected using a system bus 2450. The processor 2410 is capable of processing instructions for execution within the controller 2400. The processor may be designed using any of a number of architectures. For example, the processor 2410 may be a CISC (Complex Instruction Set Computers) processor, a RISC (Reduced Instruction Set Computer) processor, or a MISC (Minimal Instruction Set Computer) processor.

In one implementation, the processor 2410 is a single-threaded processor. In another implementation, the processor 2410 is a multi-threaded processor. The processor 2410 is capable of processing instructions stored in the memory 2420 or on the storage device 2430 to display graphical information for a user interface on the input/output device 2440.

The memory 2420 stores information within the controller 2400. In one implementation, the memory 2420 is a computer-readable medium. In one implementation, the memory 2420 is a volatile memory unit another implementation, the memory 2420 is a non-volatile memory unit.

The storage device 2430 is capable of providing mass storage for the controller 2400. In one implementation, the storage device 2430 is a computer-readable medium. In various different implementations, the storage device 2430 may be a floppy disk device, a hard disk device, an optical disk device, or a tape device.

The input/output device 2440 provides input/output operations for the controller 2400. In one implementation, the input/output device 2440 includes a keyboard and/or pointing device. In another implementation, the input/output device 2440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method of hydraulic fracturing a subsurface formation, the method comprising:
    using a deterministic model implemented on at least one processor to simulate a deviated well comprising a casing and at least one perforation cluster;
    determining a different statistical distribution for each of one or more parameters to the deterministic model based on log data from a wellbore, the statistical distributions being represented as a function of a measured depth within the wellbore;
    probabilistically solving the deterministic model implemented on the at least one processor to determine a mean and a standard deviation of breakdown pressures for each perforation cluster of the at least one perforation cluster by randomly accounting for uncertainties of the one or more parameters based on the determined statistical distributions for each of the one or more parameters;
    processing the mean and the standard deviation of breakdown pressures for each perforation cluster to determine an upper bound breakdown pressure for each perforation cluster based on a confidence level;
    drilling and completing a deviated well with a wellhead selected at least in part based on the determined upper bound breakdown pressure for each perforation cluster; and
    injecting hydraulic fluid into the deviated well at an injection pressure determined at least in part on the determined upper bound breakdown pressure for each perforation cluster to cause hydraulic fracturing of the subsurface formation.

2. The method of claim 1, further comprising determining a different mean and standard deviation of breakdown pressures for each fracturing stage of the deviated well.

3. The method of claim 1, wherein the one or more parameters include an orientation angle of the maximum horizontal stress of the subsurface formation.

4. The method of claim 3, wherein the statistical distribution of the orientation angle is a normal distribution with a mean and a standard deviation.

5. The method of claim 1, wherein the one or more parameters include a tensile strength of the subsurface formation.

6. The method of claim 5, wherein the statistical distribution of the tensile strength is a normal distribution with a mean and a standard deviation.

7. The method of claim 1, wherein the one or more parameters include both an orientation angle of the maximum horizontal stress of the subsurface formation and a tensile strength of the subsurface formation and the statistical distributions for both the orientation angle and the maximum horizontal stress are normal distributions.

8. The method of claim 1, wherein the one or more parameters include both a Young's modulus and a Poisson's ratio of the subsurface formation and both the statistical distribution of the Young's modulus and the Poisson's ratio are normal distributions.

9. The method of claim 1, wherein the one or more parameters include an azimuth angle and a deviation angle of the wellbore.

10. The method of claim 1, wherein the one or more parameters include a perforation fraction representing a fraction of wellbore pressure transferred to a perforation hole and acting on a perforation wall of the at least one perforation tunnel to counter induced hoop stresses by in-situ stresses.

11. The method of claim 1, wherein probabilistically solving the deterministic model comprises:
    randomly generating a pair of stochastic parameters based on the statistical distributions of each respective parameter of the one or more parameters using a Box-Muller method; and
    substituting the pair of randomly generated stochastic parameters into the deterministic model to determine at least part of the mean and standard deviation of breakdown pressures.

12. The method of claim 1, wherein probabilistically solving the deterministic model comprises:
    transforming, with the at least one processor, in-situ stresses from a global coordinate system to a wellbore coordinate system of a deviated portion of the deviated well that comprises at least one perforation tunnel for each perforation cluster; and
    transforming, with the at least one processor, the in-situ stresses from the wellbore coordinate system to a perforation coordinate system through at least one rotation matrix,
    wherein the breakdown pressures are determined based at least in part on the in-situ stresses in the perforation coordinate system.

13. The method of claim 1, wherein probabilistically solving the deterministic model comprises performing a Monte Carlo statistical analysis.

14. The method of claim 13, wherein performing the Monte Carlo statistical analysis involves at least one thousand different variations of the one or more parameters to the deterministic model.

15. The method of claim 1, wherein processing the mean and the standard deviation of breakdown pressures comprises generating a histogram of the breakdown pressures for each perforation cluster.

16. The method of claim 1, wherein the breakdown pressures are determined based at least in part on hoop stresses at a perforation tunnel wall of at least one perforation tunnel for each perforation cluster.

17. The method of claim 1, wherein the confidence level is a 95% confidence level.

18. The method of claim 1, further comprising determining a pump schedule of an injection pump based at least in part on the determined upper bound breakdown pressure for each perforation cluster.

19. The method of claim 18, wherein injecting the hydraulic fluid into the deviated well is performed by the injection pump using the determined pump schedule.

\* \* \* \* \*